US011959317B2

(12) United States Patent
Gordon

(10) Patent No.: US 11,959,317 B2
(45) Date of Patent: Apr. 16, 2024

(54) DOOR STOP

(71) Applicant: Randy Gordon, Hesperia, MI (US)

(72) Inventor: Randy Gordon, Hesperia, MI (US)

( * ) Notice: Subject to any disclaimer, the term of this patent is extended or adjusted under 35 U.S.C. 154(b) by 421 days.

(21) Appl. No.: 17/245,881

(22) Filed: Apr. 30, 2021

(65) Prior Publication Data

US 2022/0042358 A1 Feb. 10, 2022

Related U.S. Application Data

(60) Provisional application No. 63/063,564, filed on Aug. 10, 2020.

(51) Int. Cl.
*E05C 17/02* (2006.01)

(52) U.S. Cl.
CPC .................................... *E05C 17/02* (2013.01)

(58) Field of Classification Search
CPC ........ E05C 17/00; E05C 17/02; E05C 17/025; E05C 17/203; E05C 17/60
USPC .......................................... 16/82, 86 A, 86 B
See application file for complete search history.

(56) References Cited

U.S. PATENT DOCUMENTS 1,895,146 A * 1/1933 Brown .................... E05C 17/50 292/DIG. 19
3,833,963 A * 9/1974 Waters .................... E05C 17/54 292/343
4,017,939 A * 4/1977 Schofield ................ B32B 15/08 292/343
4,127,967 A * 12/1978 Franzl ........................ E06B 7/28 70/416
4,134,608 A * 1/1979 Pool ......................... E05C 17/52 292/DIG. 19
5,226,201 A * 7/1993 Lefebvre ................. E05C 17/52 292/87
5,689,853 A * 11/1997 Lemmer ................. E05C 17/50 292/DIG. 19
6,016,588 A * 1/2000 Kamerschen ........... E05C 17/52 16/85

* cited by examiner

*Primary Examiner* — Roberta S Delisle
(74) *Attorney, Agent, or Firm* — Dority & Manning, P.A.

(57) ABSTRACT

A door stop is provided herein that includes a base section positioned at least partially offset from a door, a forward section extending from the base section, an intermediate section extending from the base section, and a rear section. A retainment zone is defined between the base section, the forward section, and the intermediate section.

18 Claims, 24 Drawing Sheets

DOOR STOP

CROSS-REFERENCE TO RELATED APPLICATION

This application is a non-provisional application claiming the benefit of priority under 35 U.S.C. § 119(e) to U.S. Provisional Application No. 63/063,564, filed Aug. 10, 2020, which is hereby incorporated by reference in its entirety.

FIELD OF THE INVENTION

The present disclosure generally relates to a door stop that can be used for restricting further rotational movement of a door beyond a defined position.

BACKGROUND OF THE INVENTION

A door stop is a device mounted to a baseboard, a wall, or a door for stopping a door and/or a door's hardware, such as a doorknob, from slamming into and ruining the wall. However, it is desired to create a door stop that is capable of retaining the door in the open position in addition to restricting further rotation of the door.

SUMMARY OF THE INVENTION

Aspects and advantages of the disclosure will be set forth in part in the following description, or may be obvious from the description, or may be learned through practice of any of the aspects of the present disclosure.

According to some aspects of the present disclosure, a door stop includes a base section configured to be positioned at least partially offset from a door. The door stop also includes a forward section extending from the base section. An intermediate section extends from the base section at a position along the base section that is spaced apart from the forward section. A rear section extends from the base section at a position along the base section that is spaced apart from the intermediate section. A retainment zone is defined between the base section, the forward section, and the intermediate section.

According to some aspects of the present disclosure, a door assembly includes a door rotatable between a first position and a second position. A door stop is configured to contact the door as the door is rotated between the first position and the second position. The door stop includes a base section configured to be positioned at least partially offset from the door. A forward section extends from the base section. An intermediate section extends from the base section at a position along the base section that is spaced apart from the forward section. A retainment zone is defined between the base section, the forward section, and the intermediate section. The door is positioned within the retainment zone when placed in the first position.

According to some aspects of the present disclosure, a method of operating a door stop is provided herein. The method includes contacting a forward section of the door stop with a door. The method also includes pressing the door against the forward section causing deflection of a base section of the door stop. The method further includes passing a door beyond the forward section while the base section is deflected.

These and other features, aspects, and advantages of the present disclosure will become better understood with reference to the following description and appended claims.

The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, directed to one of ordinary skill in the art, is set forth in the specification, which makes reference to the appended figures, in which.

DETAILED DESCRIPTION OF THE PREFERRED EXAMPLES

Figure 1:
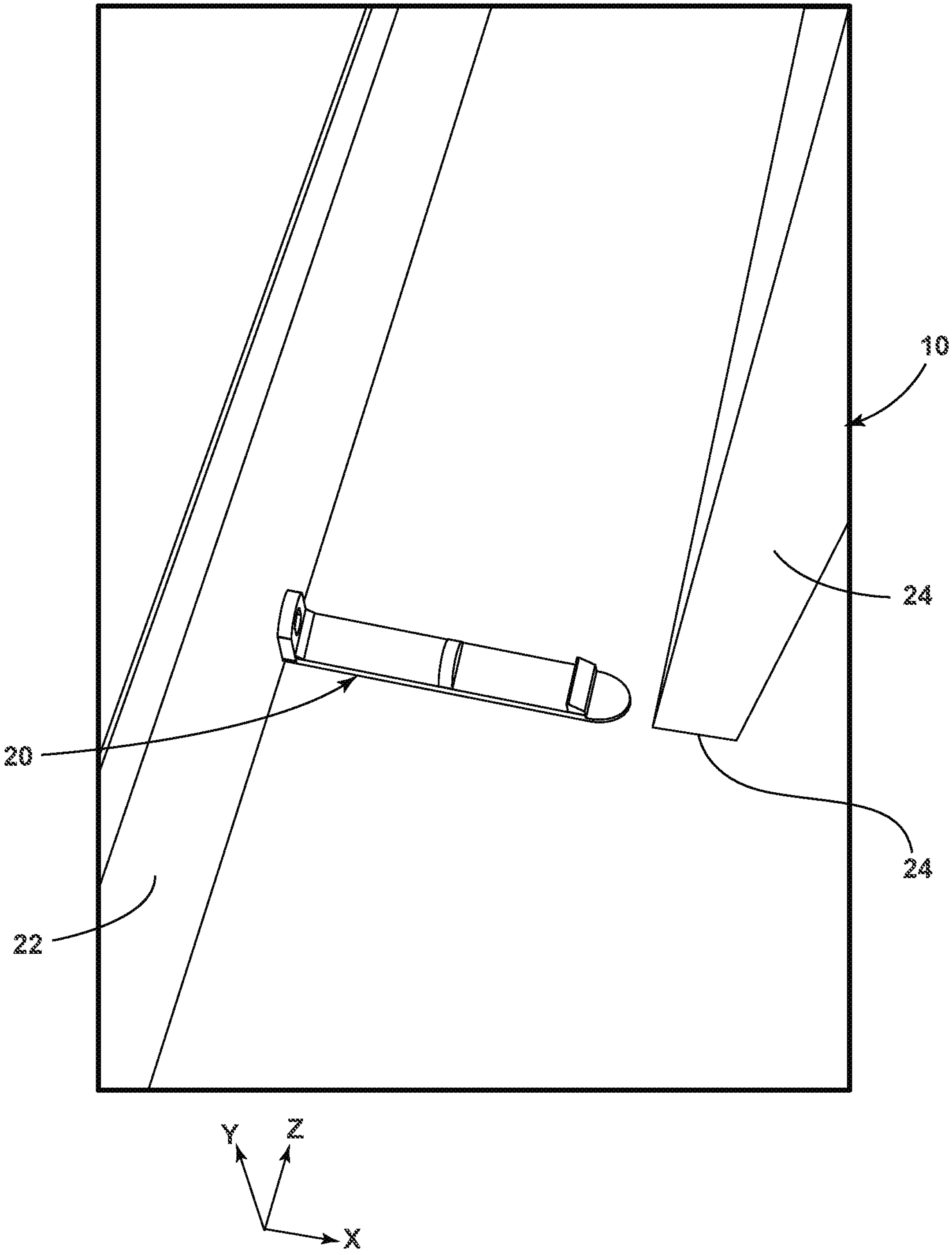
FIG. 1 is a side perspective view of the partially opened door and the door stop according to various aspects of the present disclosure.

For purposes of description herein, the terms "upper," "lower," "right," "left," "rear," "front," "vertical," "horizontal," and derivatives thereof shall relate to the embodiment of the invention as oriented in FIG. 1. However, it is to be understood that the invention may assume various alternative orientations, except where expressly specified to the contrary. It is also to be understood that the specific devices and processes illustrated in the attached drawings, and described in the following specification are examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples of the invention that may be embodied in various and alternative forms. The figures are not necessarily to a detailed design and some schematics may be exaggerated or minimized to show a function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if any assembly or composition is described as containing components A, B, and/or C, the assembly or composition can contain A alone; B alone; C alone; A and B in combination; A and C in combination; B and C in combination; or A, B, and C in combination.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a twenty percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The following disclosure describes a door assembly that can include a door rotatable between a first position and a second position. The door assembly can further include a door stop including a base section positioned at least partially offset from the door. The door stop can include a forward section extending from the base section, an intermediate section extending from the base section, and a rear section. A retainment zone is defined between the base section, the forward section, and the intermediate section. The retainment zone is configured to restrict further movement of the door in one direction beyond the retainment zone and/or maintain a portion of the door therein.

Referring now to the drawings, wherein identical numerals indicate the same elements throughout the figures, FIGS. 1-4 generally illustrate a door 10 attached to a door frame 12 through one or more hinges 14 and configured to rotate between a plurality of positions. The plurality of positions may include a first open position, a second intermediate position, and a third closed position.

The door 10 has a door outer surface 16 and a doorknob 18 secured to the door 10. A door stop 20 can be attached to a structure proximate to the door 10, such as a wall 22. In some instances, the door stop 20 can be attached to the wall 22 and configured to project towards the door outer surface 16. Furthermore, the door stop 20 can project in the path of the swinging door 10 such that the door 10 contacts the door stop 20 while moving from the third position to the first position.

Figure 2:
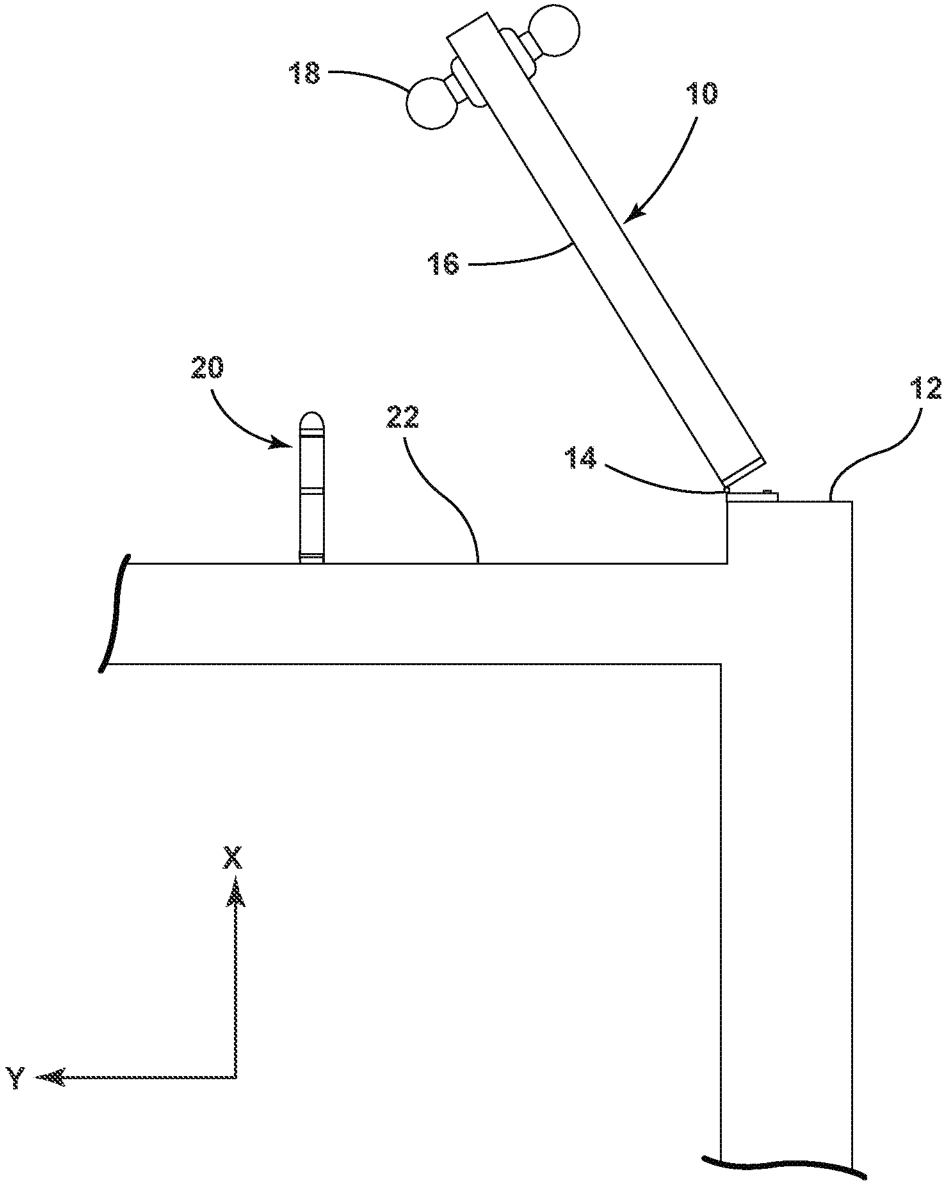
FIG. 2 is a plan view of a partially opened door and a door stop coupled to a wall behind the door according to various aspects of the present disclosure.
Figure 3:
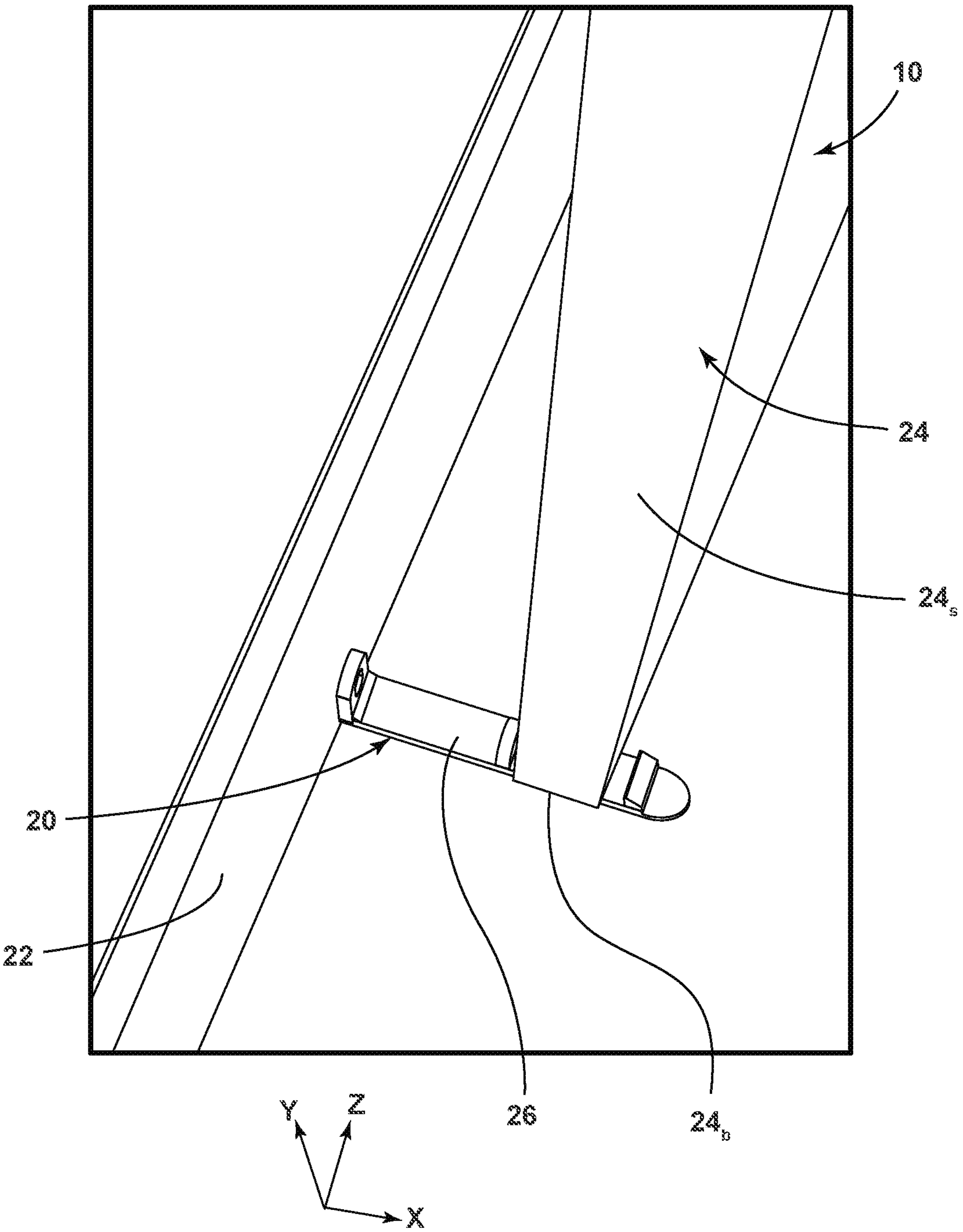
FIG. 3 is a side perspective view of the opened door contacting the door stop according to various aspects of the present disclosure.
Figure 4:
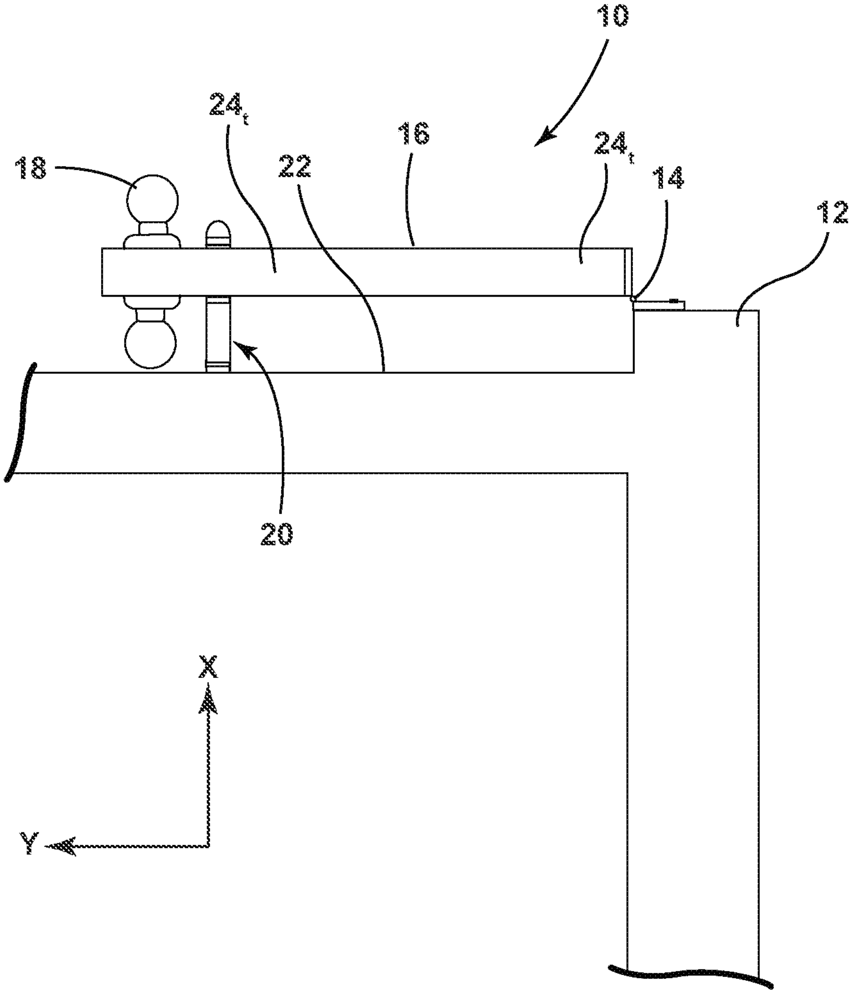
FIG. 4 is a plan view of an opened door contacting the door stop according to various aspects of the present disclosure.
Figure 5:
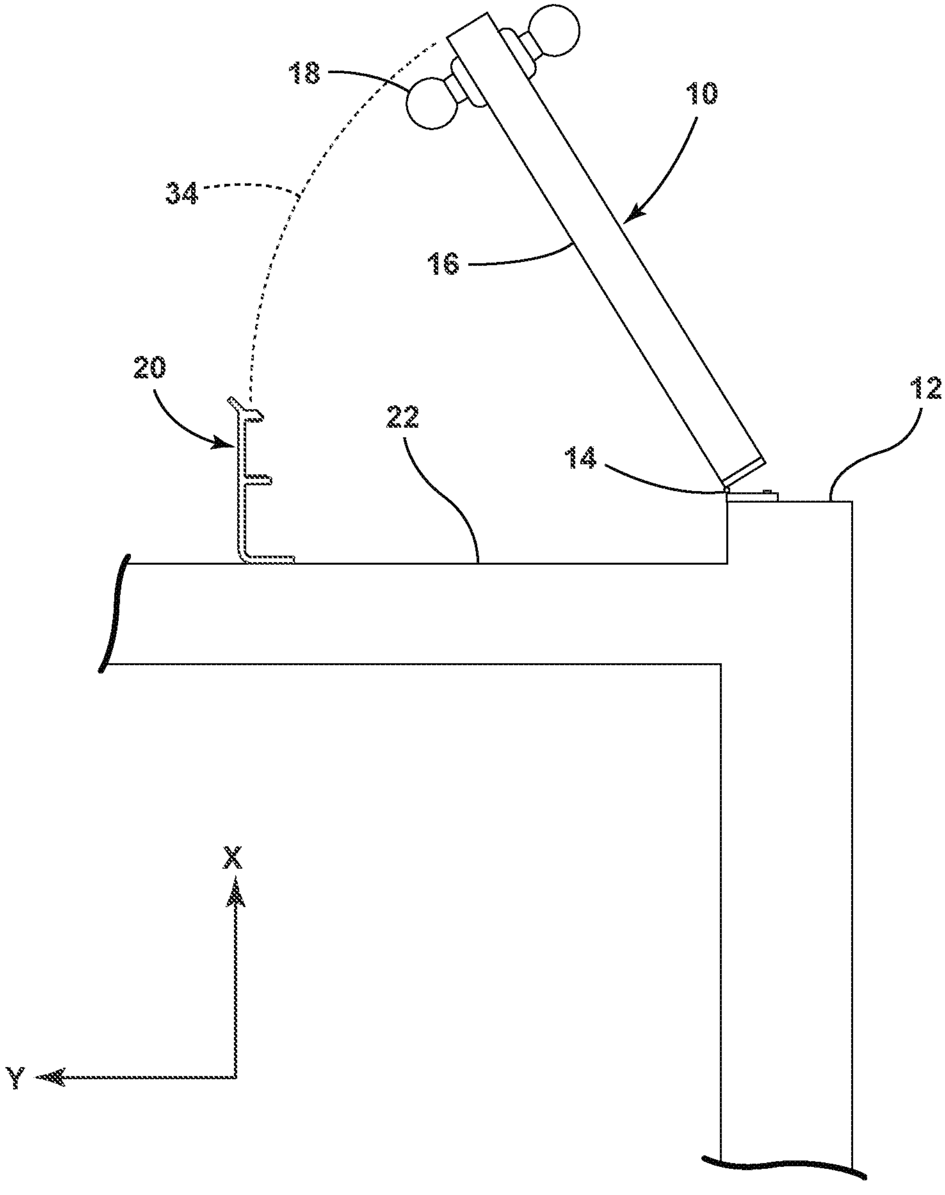
FIG. 5 is a plan view of a partially opened door and a door stop coupled to a wall behind the door according to various aspects of the present disclosure.
Figure 6:
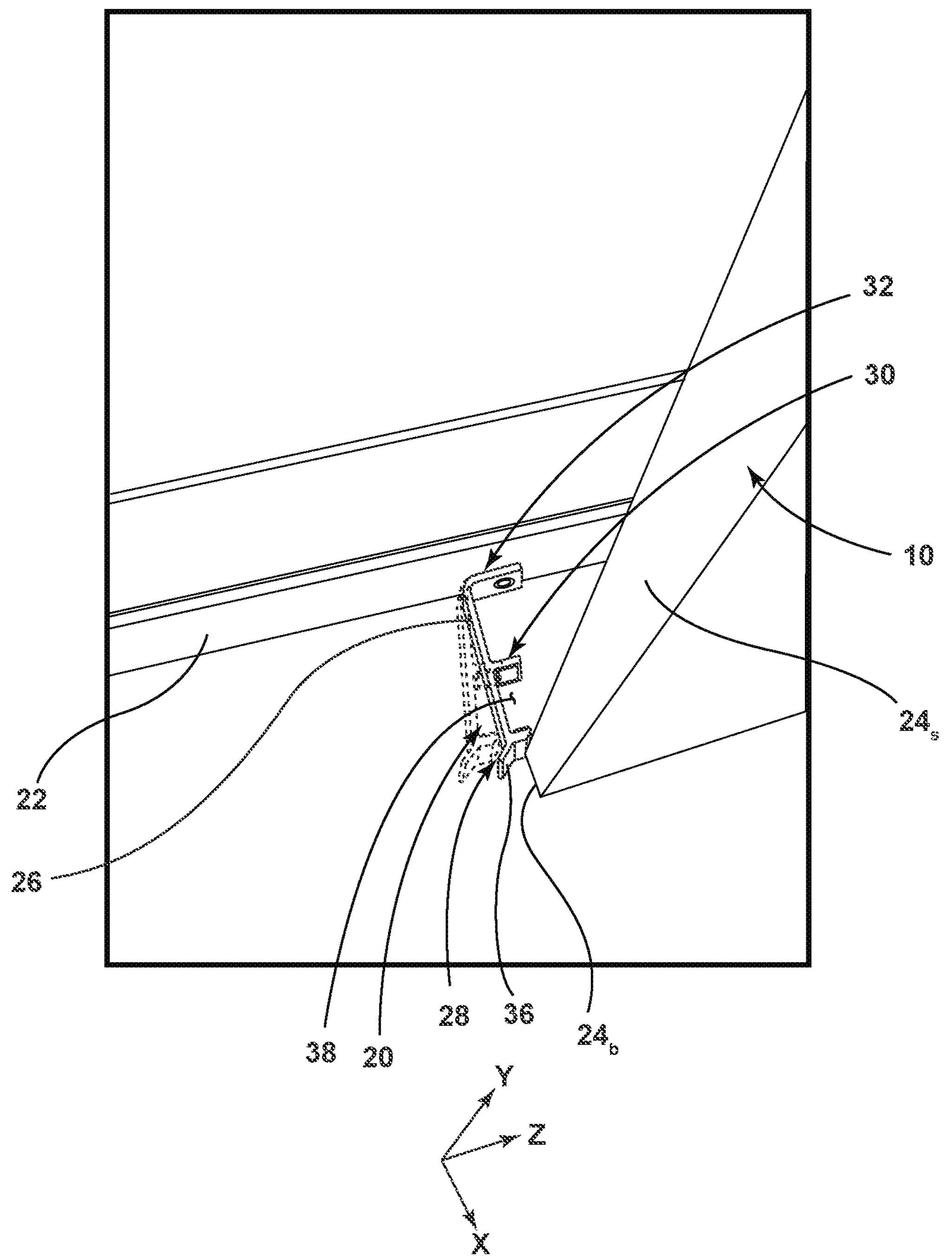
FIG. 6 is a side perspective view of the partially opened door and the door stop according to various aspects of the present disclosure.
Figure 7:
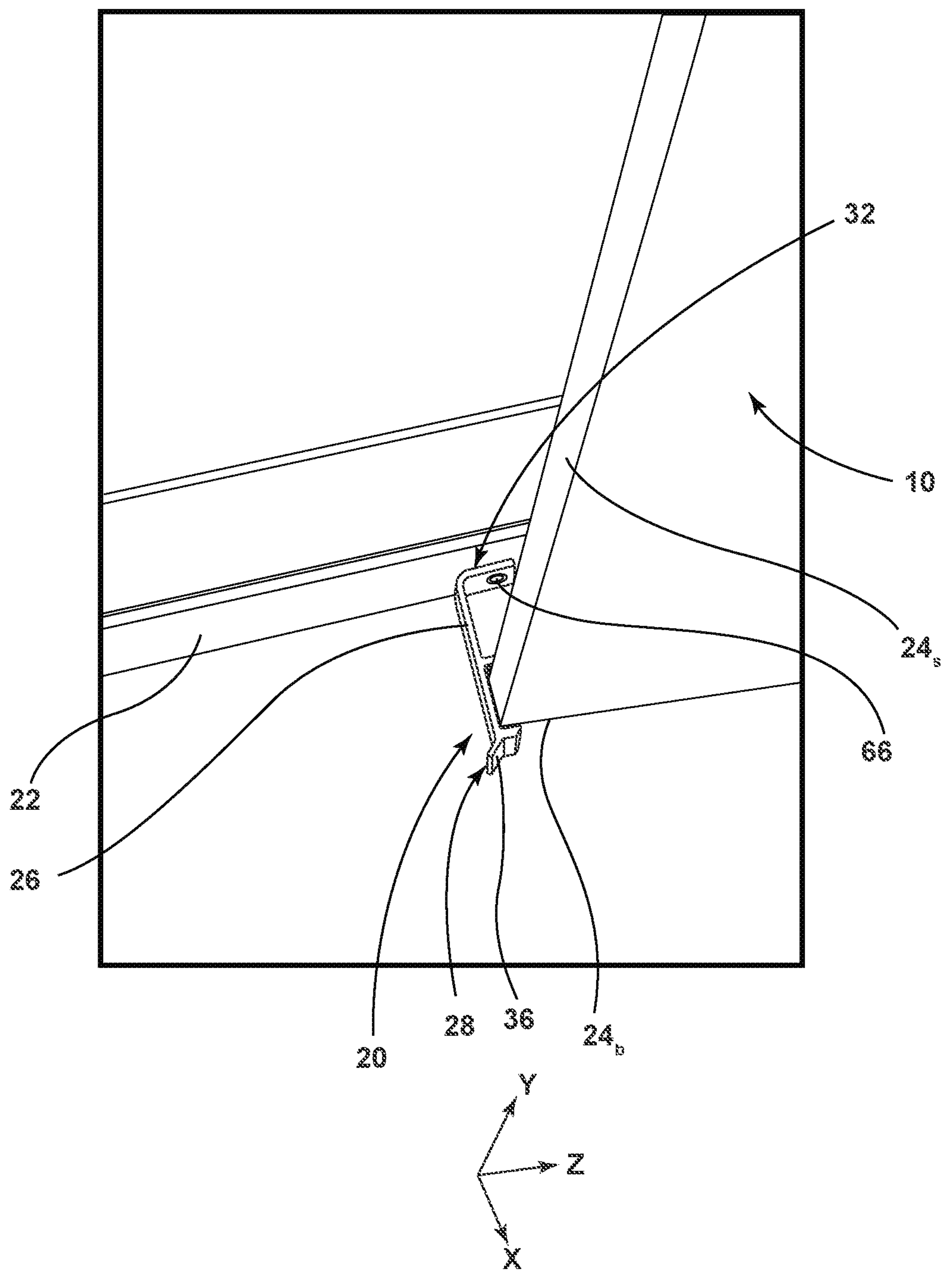
FIG. 7 is a side perspective view of the opened door contacting the door stop on a side surface of the door according to various aspects of the present disclosure.
Figure 8:
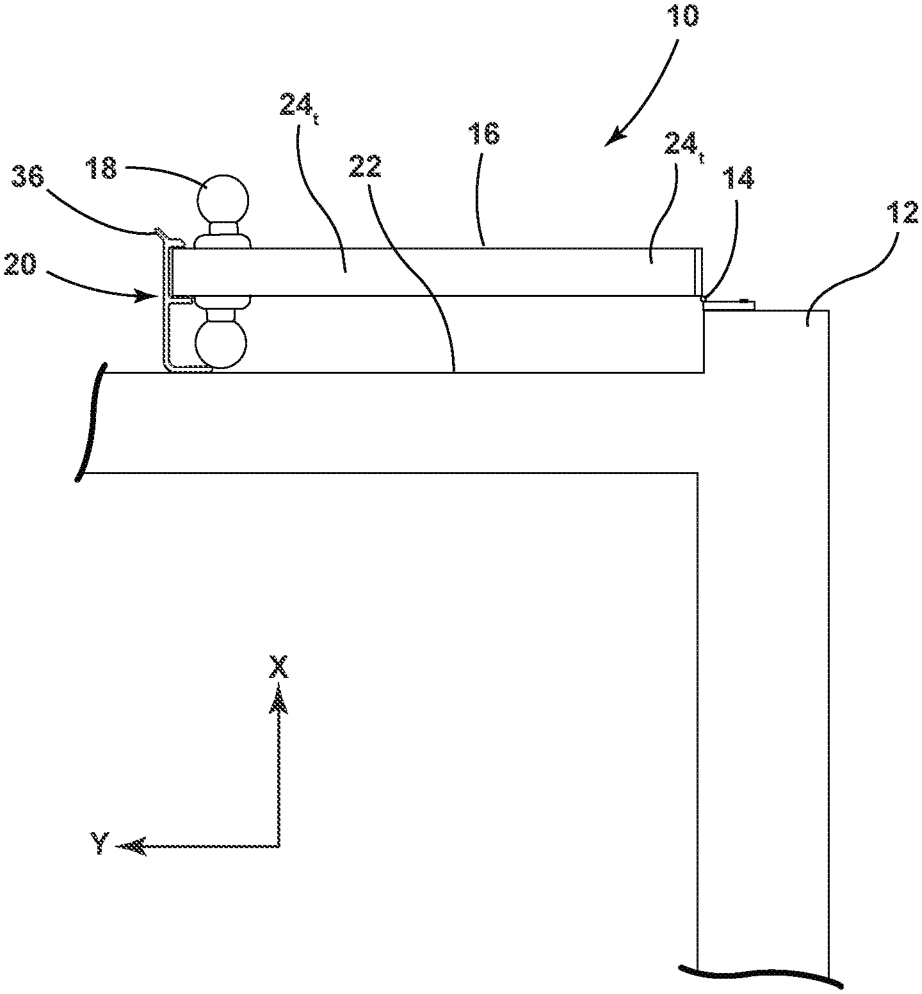
FIG. 8 is a plan view of a partially opened door and a door stop coupled to a wall behind the door according to various aspects of the present disclosure.

Referring further to FIGS. 3 and 4, the door 10 may be placed in the first, fully open position contacting the door stop 20. The doorknob 18, however, is generally prevented from contacting the wall 22. In various examples, the door stop 20 may include a portion, such as a base portion, that can be positioned in an offset position relative to an edge portion 24 of the door 10. For instance, as illustrated in FIGS. 1-4, the base portion of the door stop 20 may be positioned in a vertical offset orientation from a bottom edge portion 24*b* of the door 10. Additionally or alternatively, the door stop 20 may also be positioned in a vertically offset manner (e.g., slightly above) a top edge portion 24*t* of the door 10. By positioning the door stop 20 along a side edge portion 24 or along a top edge portion 24 of the door 10, the door stop 20 may be placed at a height that is not easily reachable by younger children. Accordingly, when the door 10 is retained by the door stop 20, the younger child may not be able to move the door 10 from the open position.

Figure 9:
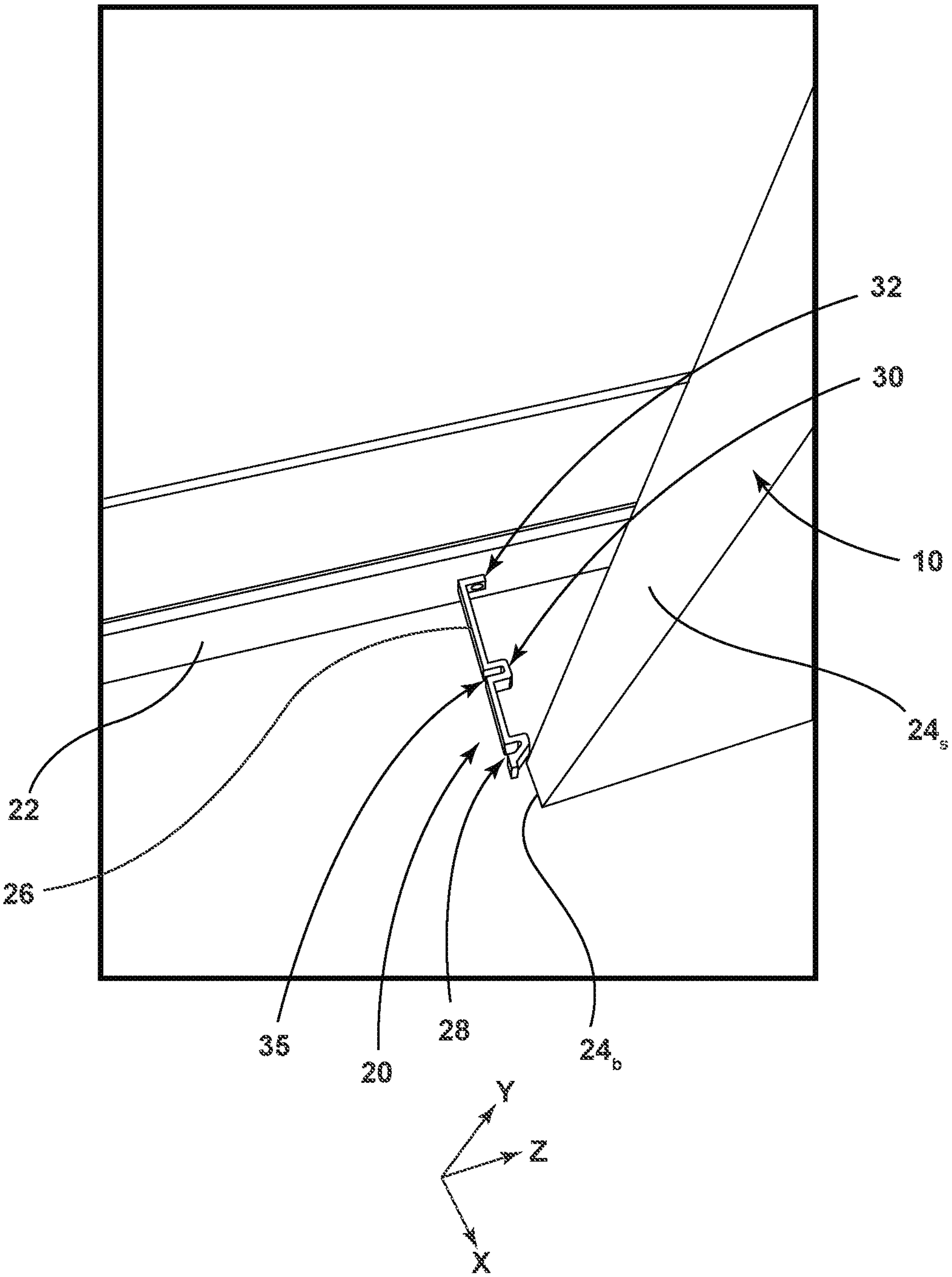
FIG. 9 is a side perspective view of the partially opened door and the door stop according to various aspects of the present disclosure.
Figure 10:
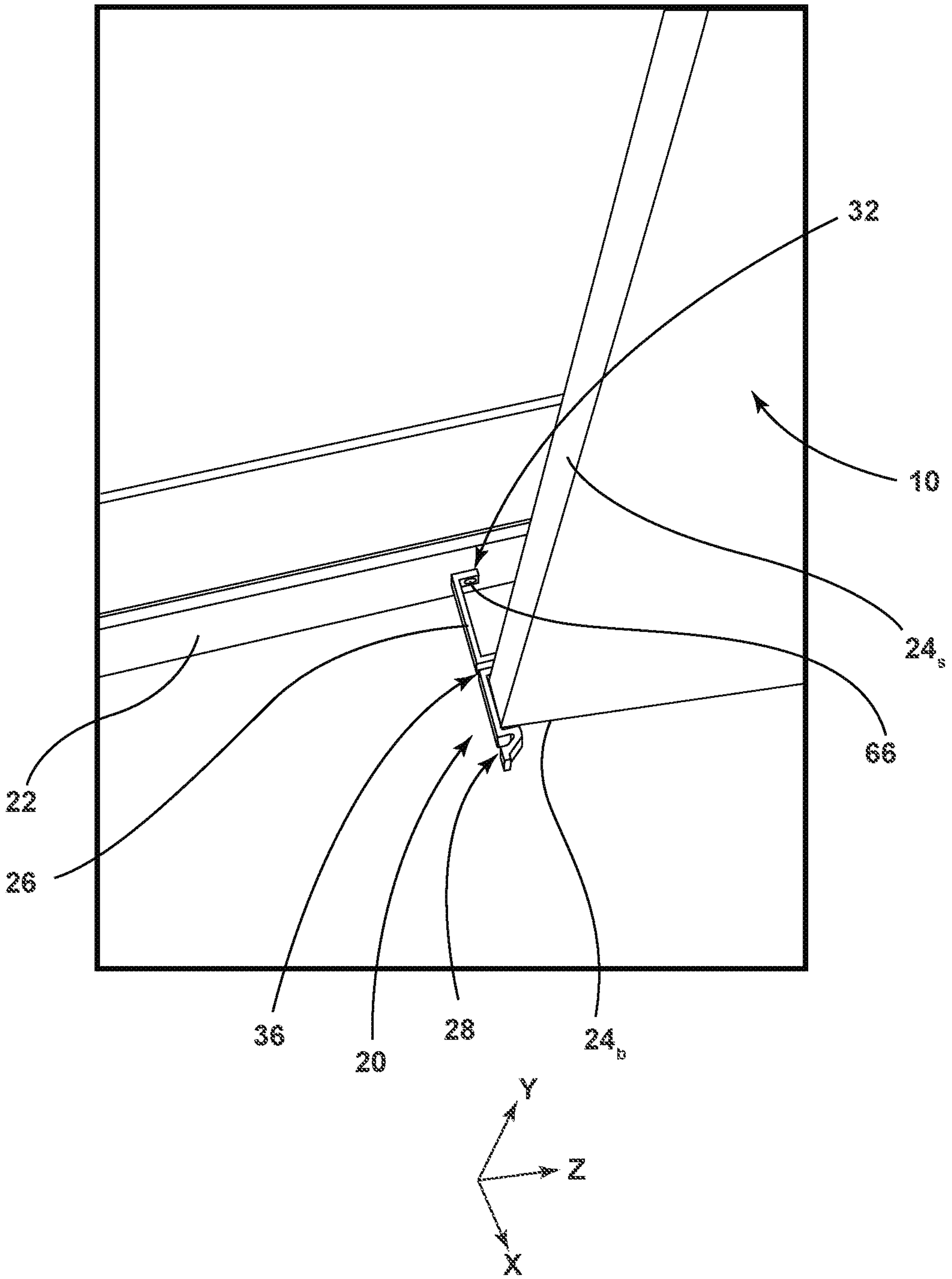
FIG. 10 is a side perspective view of the opened door contacting the door stop on a side surface of the door according to various aspects of the present disclosure.

Referring now to FIGS. 5-10, in some instances, the door stop 20 may be laterally offset from a side edge portion 24*s* of the door 10. In such instances, the door stop 20 may be placed laterally outward of a radius of rotation 34 of the door. In operation, the door 10 may be rotated towards the door stop 20. As the door 10 contacts the door stop 20, the door may be generally prevented from further rotation towards the wall 22. In addition, when the door 10 contacts the door stop 20, shock may be absorbed by the door stop 20. If the door 10 is to be retained in the open position, a release tab 36 may be pressed away from the door 10 thereby deflecting the door stop 20 away from the radius of rotation 34, as shown in phantom in FIG. 6. With the door stop 20 deflected, the door 10 may be placed in a retainment zone 38 of the door stop 20. To close the door 10, the release tab 36 may again be pressed to deflect the door stop 20 away from the radius of rotation 34. With the door stop 20 deflected, the door 10 may be rotated away from the door stop 20. With further reference to FIGS. 9 and 10, the base section 26 may include a bend portion 35 that allows for further bending and/or predefined bending along the base section 26.

As illustrated in FIGS. 11-33, the door stop 20 may include the base section 26 positioned at least partially offset from a door 10, a forward section 28 extending from the base section 26, an intermediate section 30 extending from the base section 26, and a rear section 32. It will be appreciated, however, that in various examples, the door stop 20 may include a forward section 28 and a rear section 32 with the door configured to be retained therebetween without departing from the teachings provided herein.

The base section 26 may be a generally elongated member that supports the remaining sections and/or portions of the door stop 20. In various instances, the base section 26 may be formed from a resilient material. For example, the base section 26 may be formed from a metallic material, a polymeric material, an elastomeric material, a composite material, combinations thereof, and/or any other practical material. In various examples, the door stop 20 provided herein may be formed through various manufacturing processes, such as a punching process and/or a bending process. Additionally, or alternatively, the door stop 20 may be formed from any other subtractive and/or additive manufacturing processes, such as injection molding, thermoforming, or any other practicable process.

In some examples, a forward portion of the base section 26 and/or the forward section 28 may define a release tab 36. When pressure is applied to the release tab 36 in a direction that is opposite to a door side of the base section 26, the base section 26 can be deflected away from the door 10 thereby releasing the door 10. In some examples, the release tab 36 may extend from the base section 26 on a first side of an extension axis EA of the base section 26 and the forward section 28 may extend from the base section 26 on a second side of an extension axis EA of the base section 26. In addition, the release tab 36 may extend in an offset direction from the extension axis EA at a first angle $\theta_1$ while the forward section 28 may extend in an offset direction from the extension axis EA at a second angle $\theta_2$. In various embodiments, the first angle $\theta_1$ may be less than the second angle $\theta_2$. Moreover, in some non-limiting examples, the first angle $\theta_1$ may be between 10-80 degrees while the second angle $\theta_2$ may be between 45-135 degrees.

Figure 11:
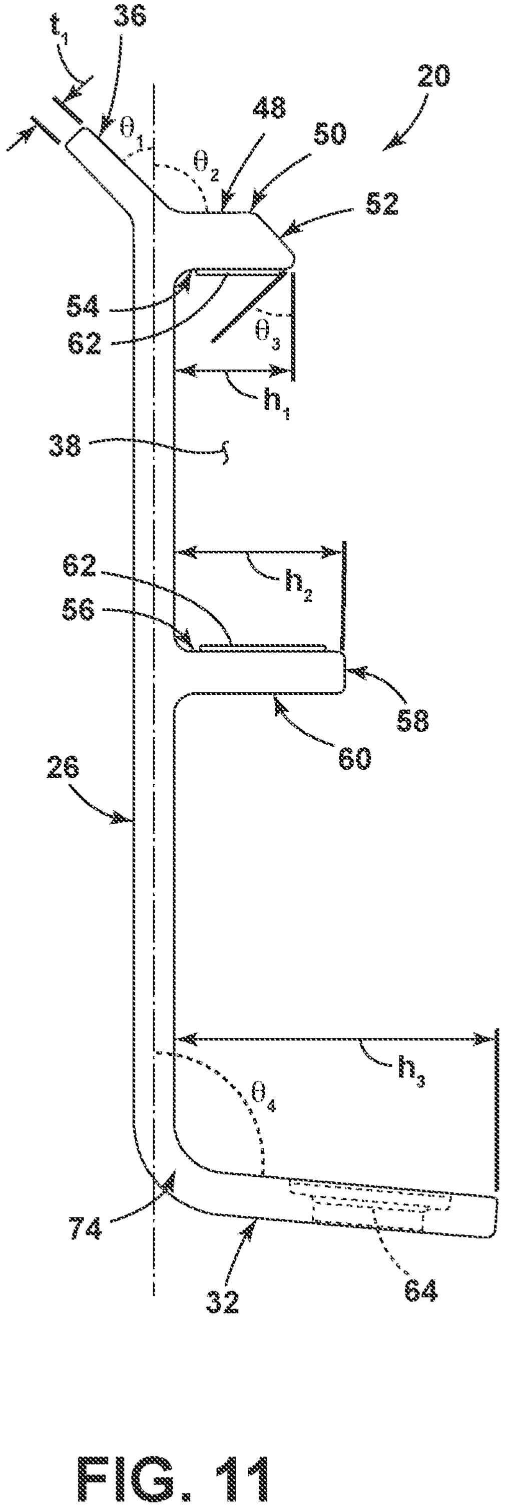
FIG. 11 is a first side plan view of the door stop according to various aspects of the present disclosure.
Figure 12:
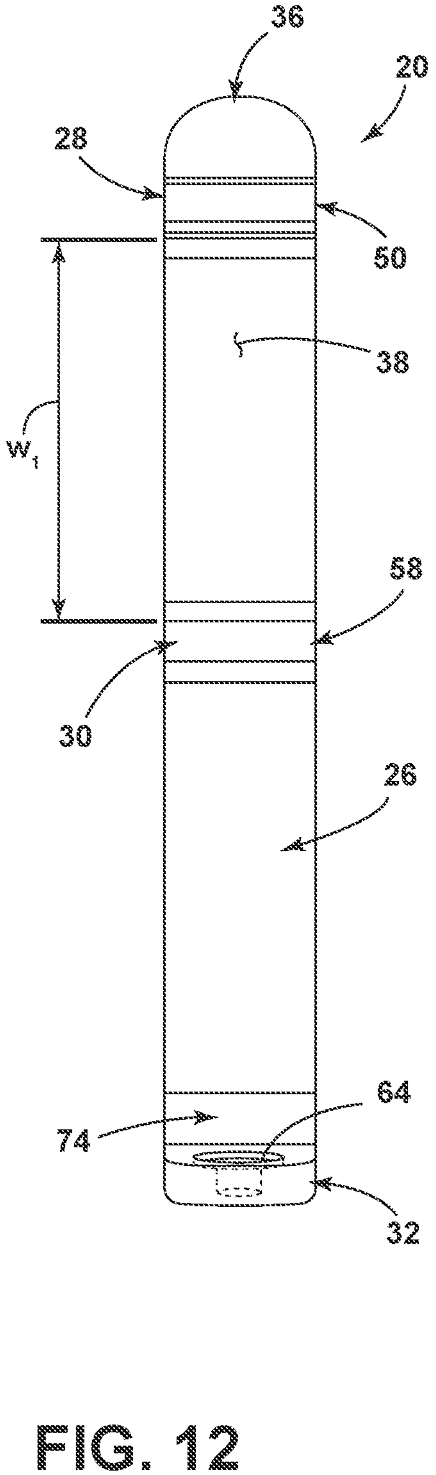
FIG. 12 is a top plan view of the door stop according to various aspects of the present disclosure.
Figure 13:
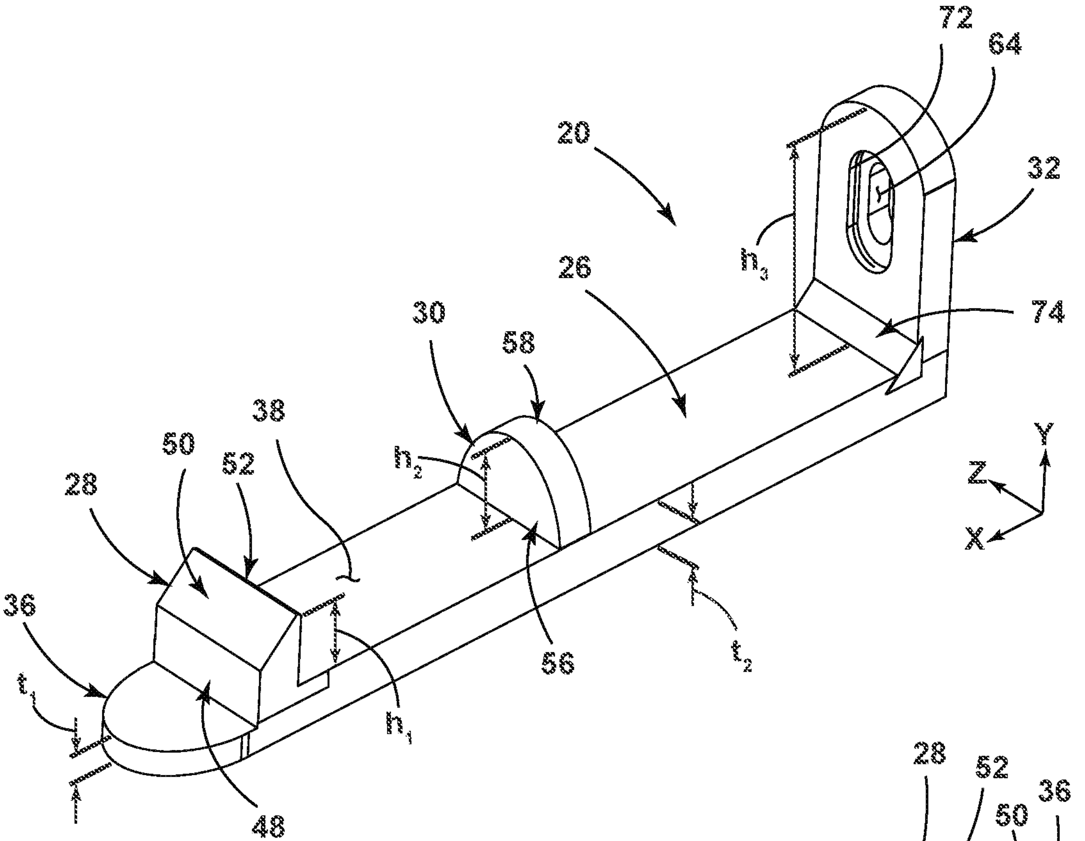
FIG. 13 is a front perspective view of the door stop according to various aspects of the present disclosure.
Figure 14:
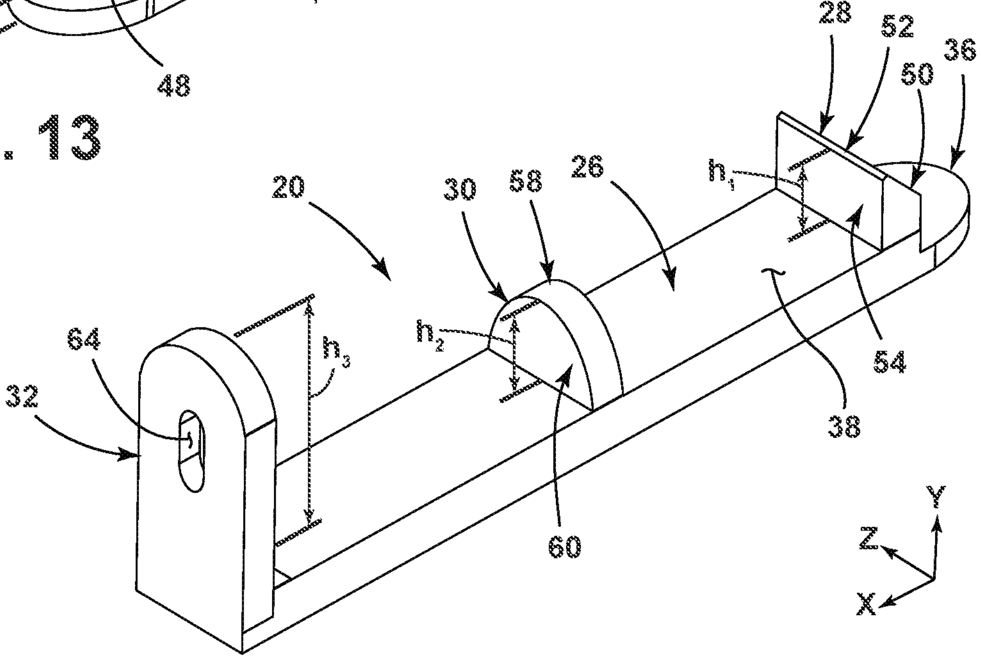
FIG. 14 is a rear perspective view of the door stop according to various aspects of the present disclosure.
Figure 15:
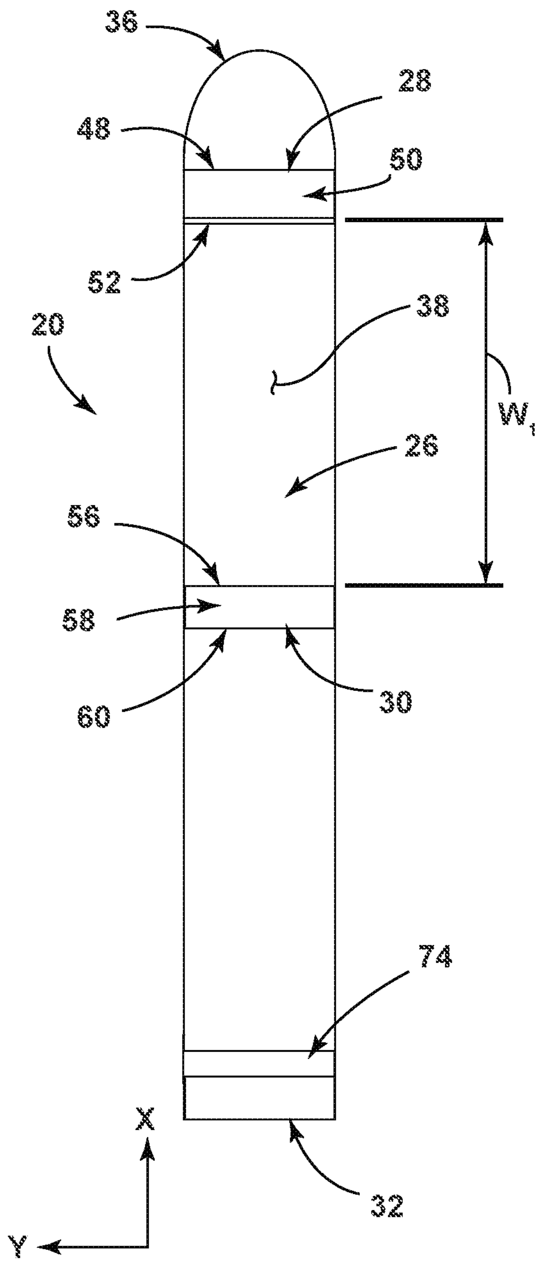
FIG. 15 is a top plan view of the door stop according to various aspects of the present disclosure.
Figure 16:
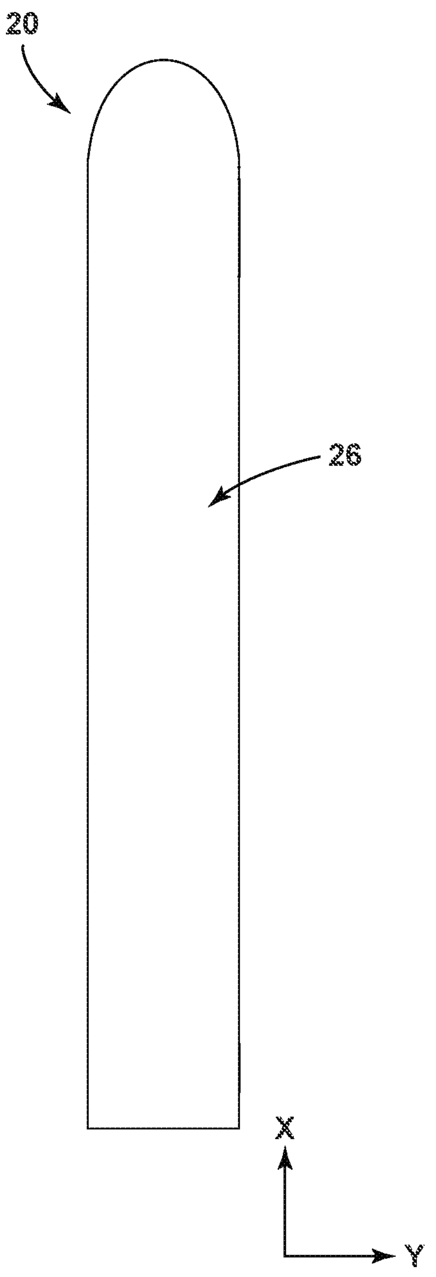
FIG. 16 is a bottom plan view of the door stop according to various aspects of the present disclosure.
Figure 17:
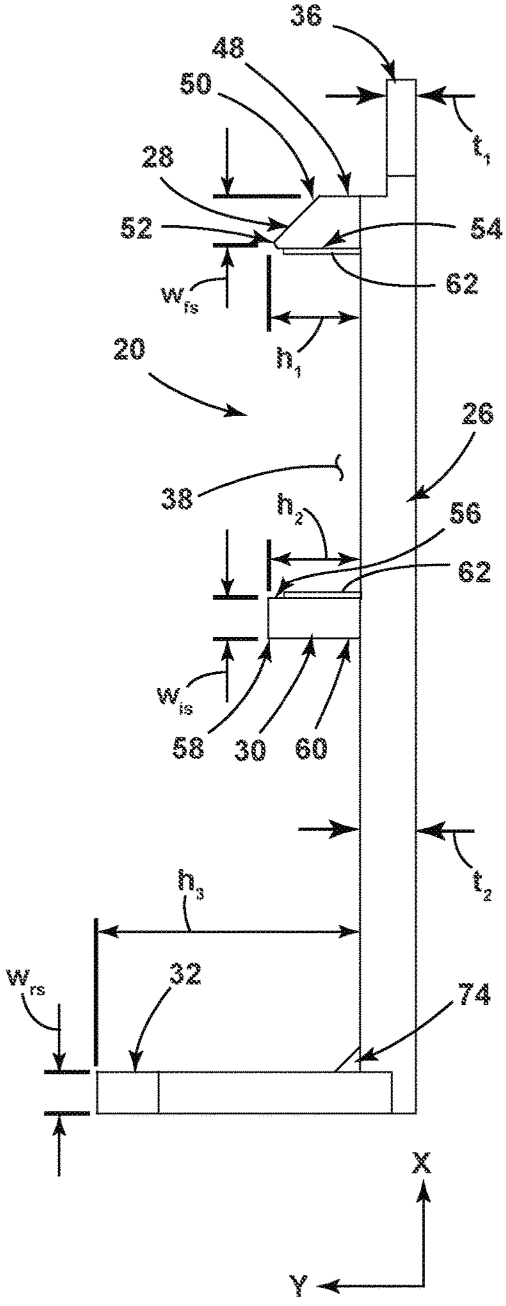
FIG. 17 is a first side plan view of the door stop according to various aspects of the present disclosure.
Figure 18:
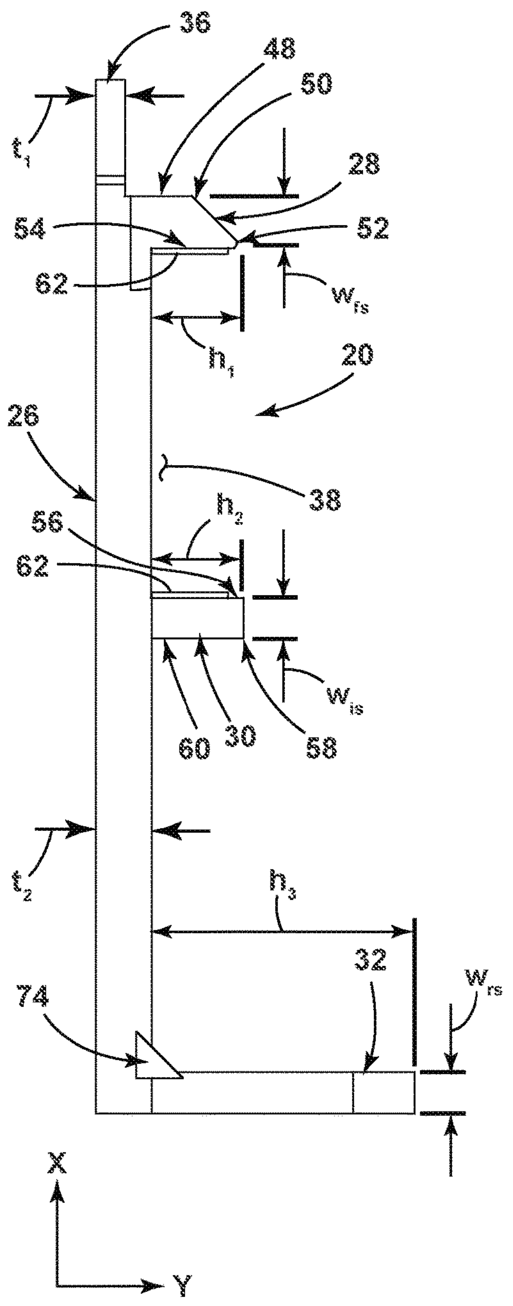
FIG. 18 is a second side plan view of the door stop according to various aspects of the present disclosure.
Figure 20:
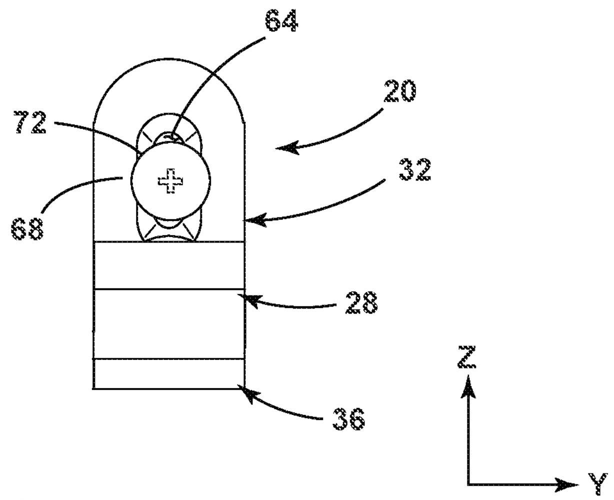
FIG. 20 is a rear plan view of the door stop according to various aspects of the present disclosure.
Figure 19:
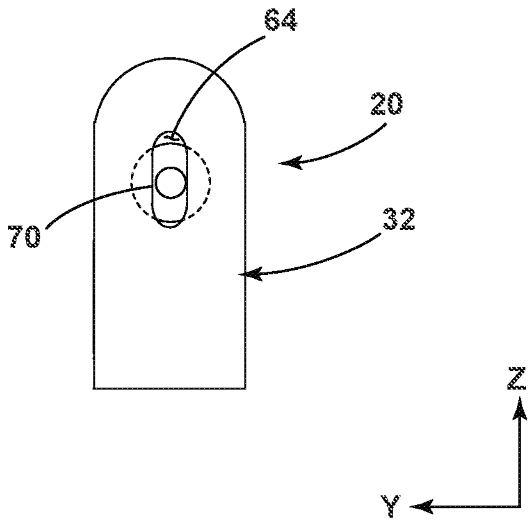
FIG. 19 is a front plan view of the door stop according to various aspects of the present disclosure.
Figure 21:
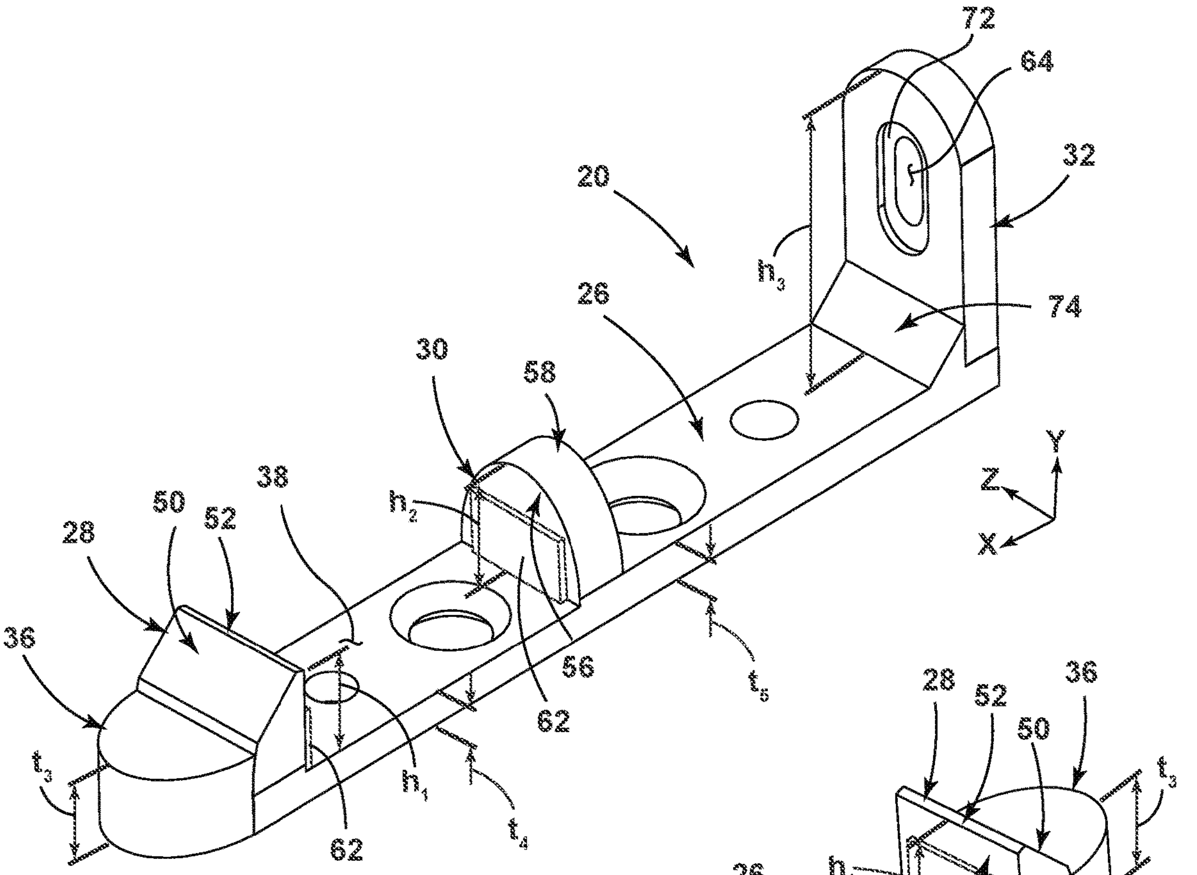
FIG. 21 is a front perspective view of the door stop according to various aspects of the present disclosure.
Figure 22:
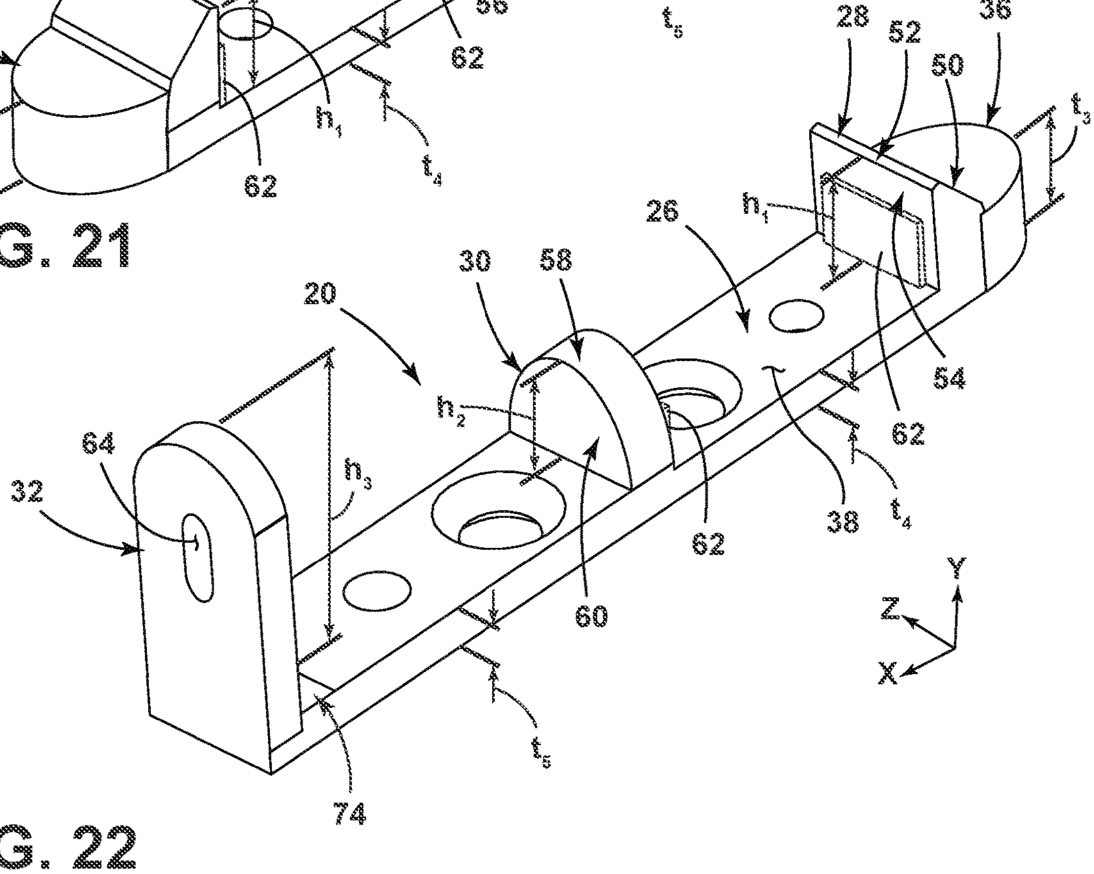
FIG. 22 is a rear perspective view of the door stop according to various aspects of the present disclosure.
Figure 23:
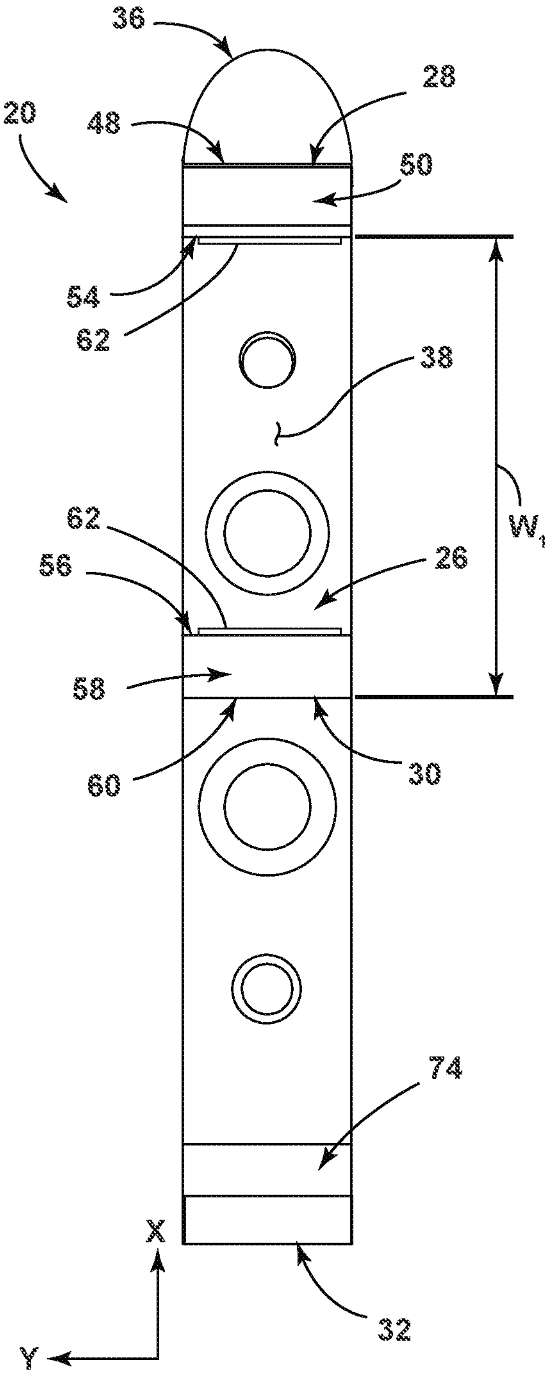
FIG. 23 is a top plan view of the door stop according to various aspects of the present disclosure.
Figure 24:
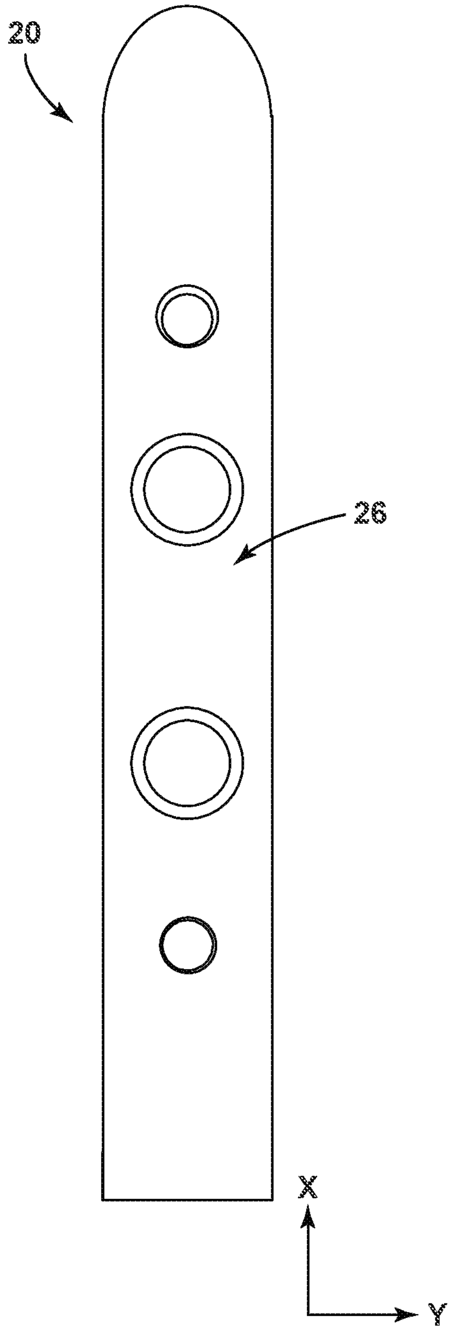
FIG. 24 is a bottom plan view of the door stop according to various aspects of the present disclosure.
Figure 25:
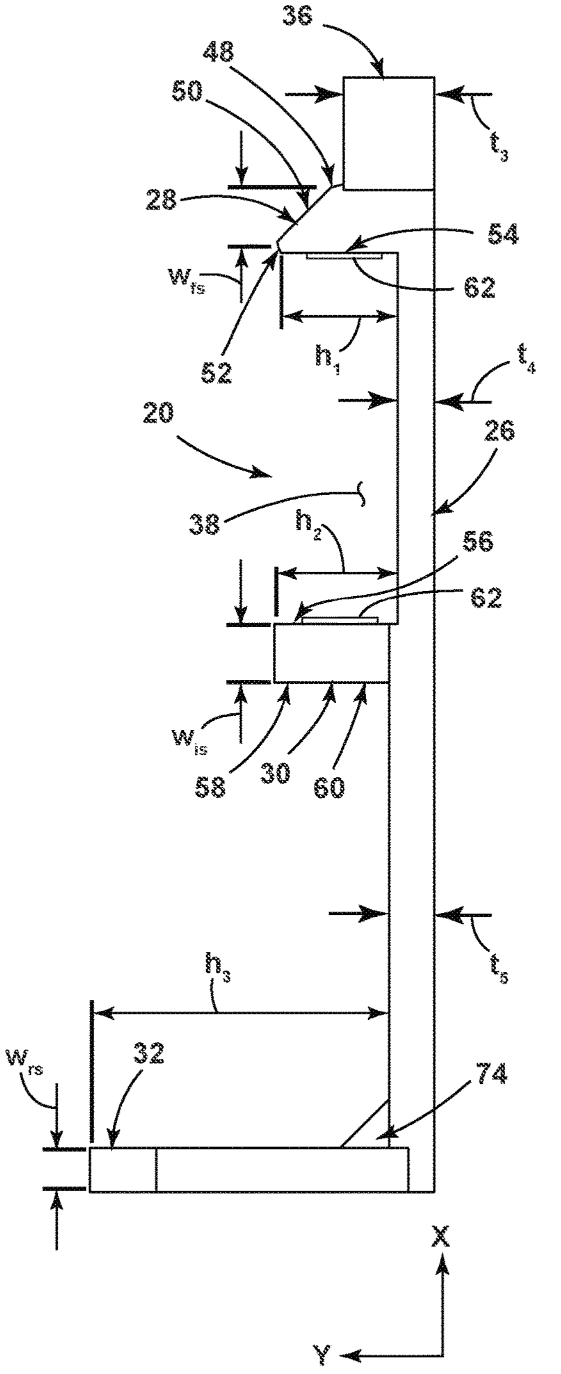
FIG. 25 is a first side plan view of the door stop according to various aspects of the present disclosure.
Figure 26:
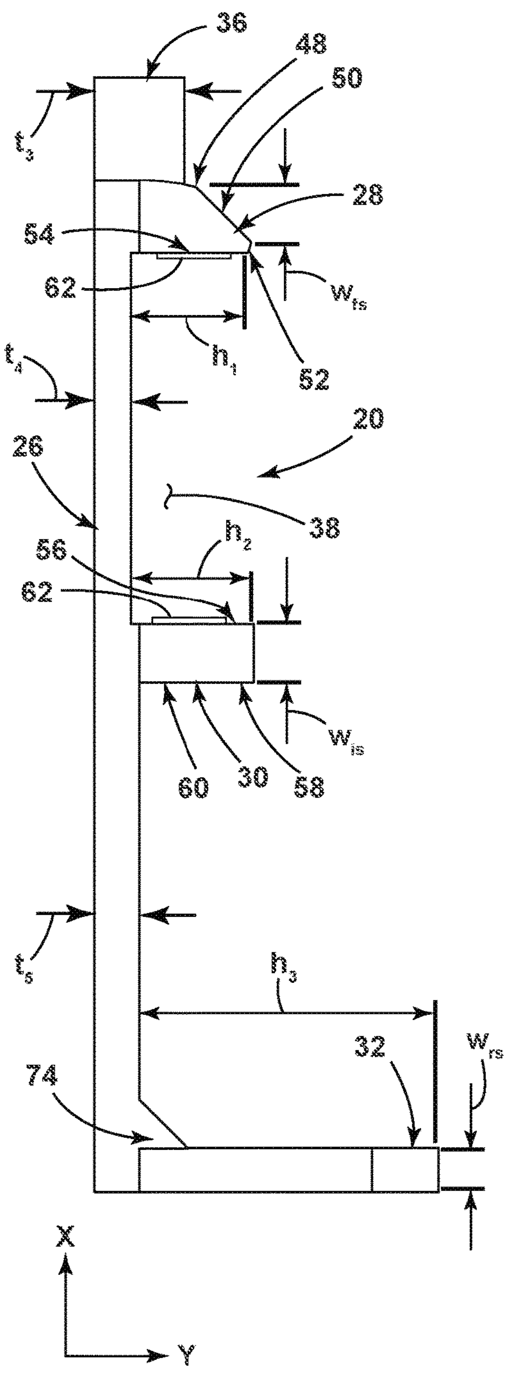
FIG. 26 is a second side plan view of the door stop according to various aspects of the present disclosure.
Figure 27:
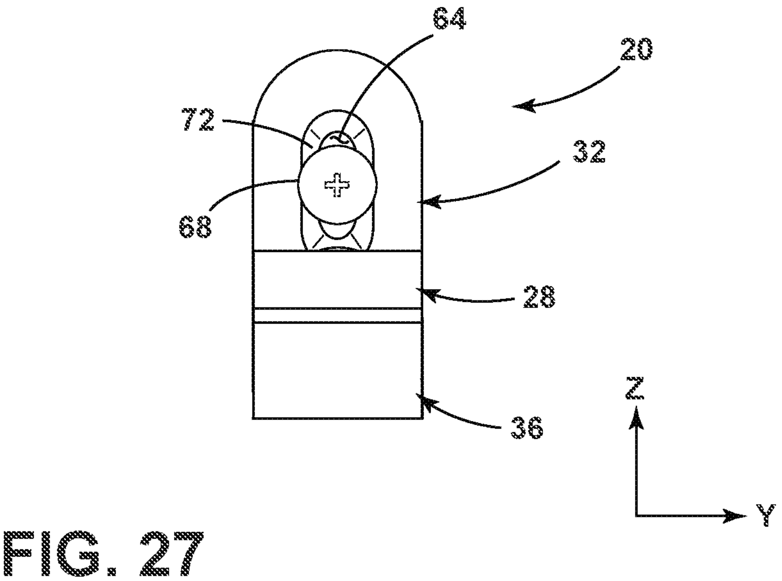
FIG. 27 is a front plan view of the door stop according to various aspects of the present disclosure.
Figure 28:
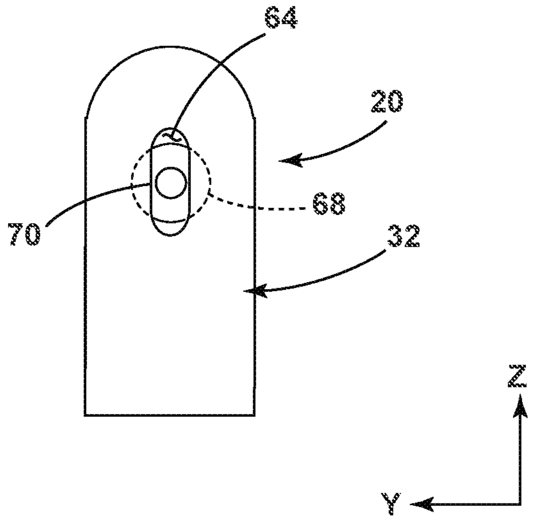
FIG. 28 is a rear plan view of the door stop according to various aspects of the present disclosure.
Figure 29:
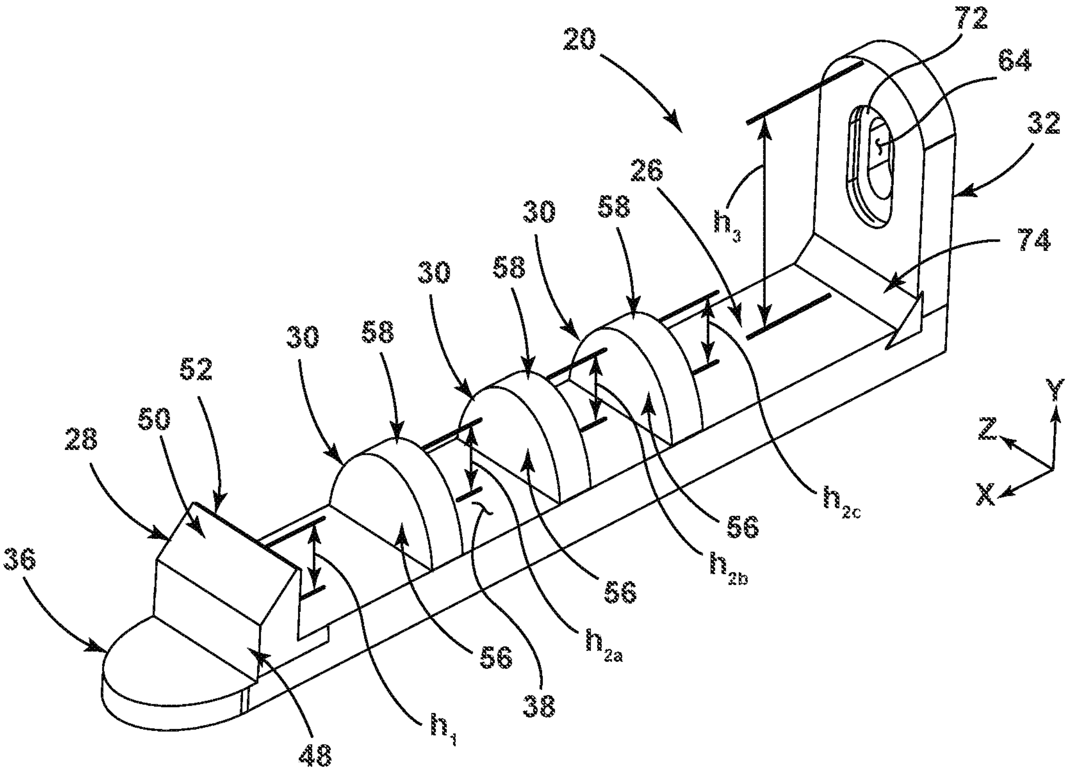
FIG. 29 is a front perspective view of the door stop according to various aspects of the present disclosure.
Figure 30:
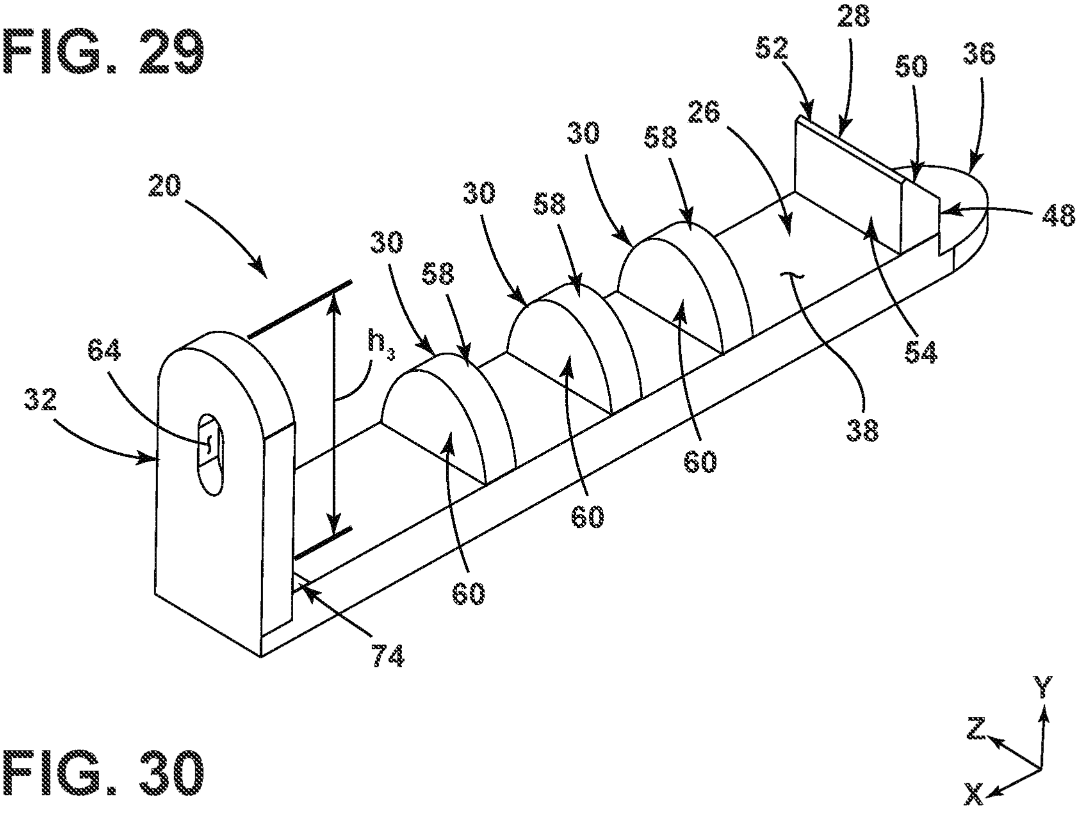
FIG. 30 is a rear perspective view of the door stop according to various aspects of the present disclosure.
Figure 31:
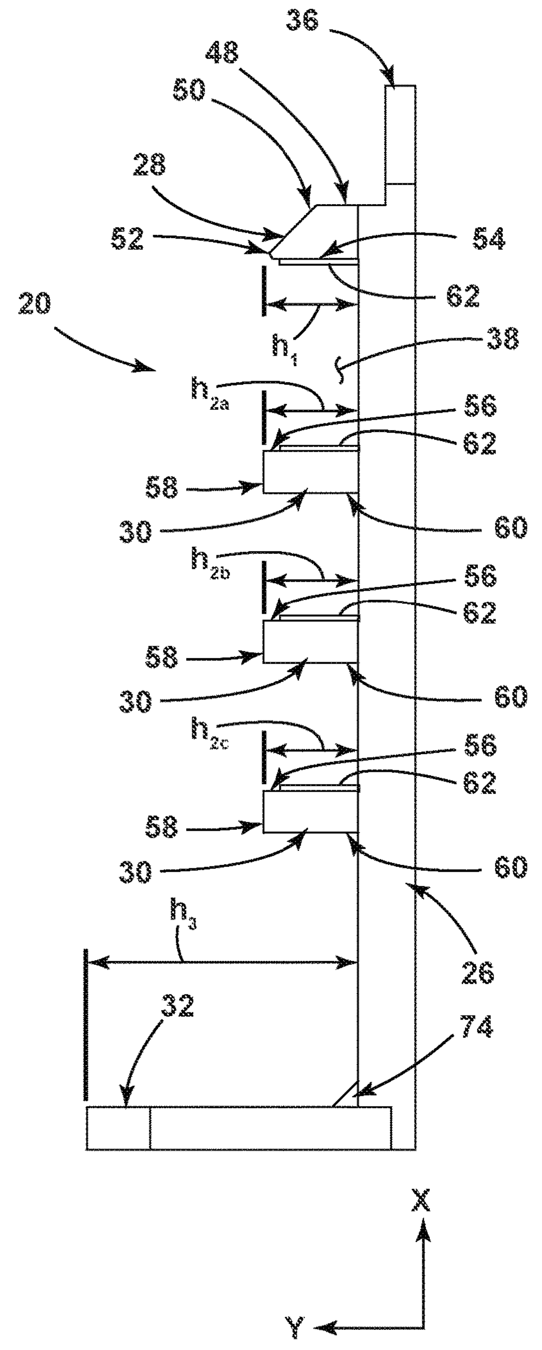
FIG. 31 is a first side plan view of the door stop according to various aspects of the present disclosure.
Figure 32:
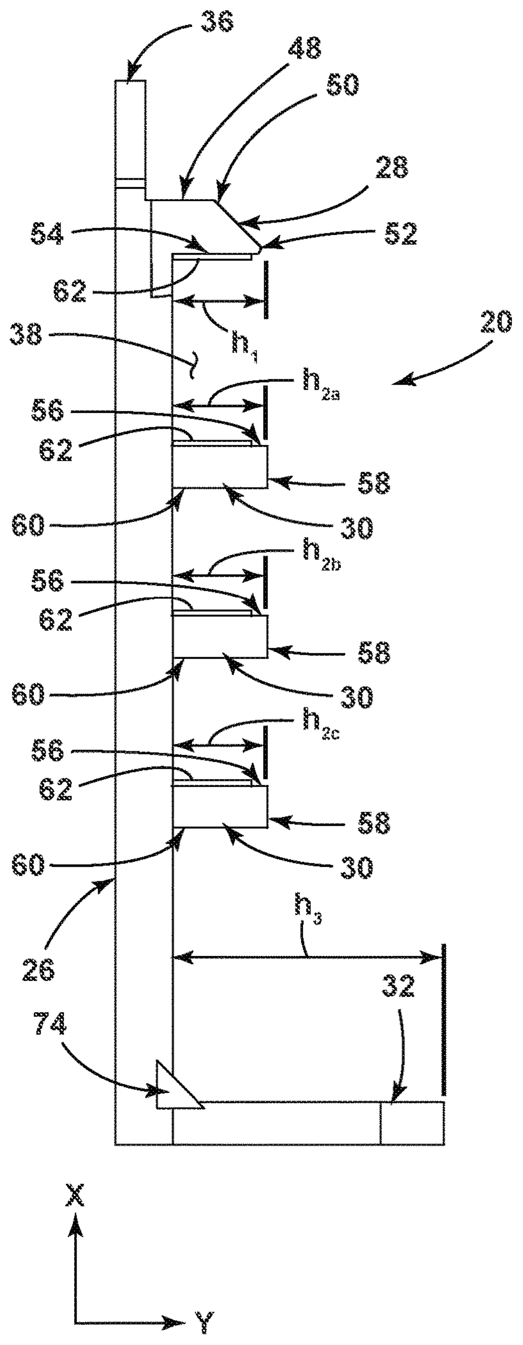
FIG. 32 is a second side plan view of the door stop according to various aspects of the present.

Referring further to FIGS. 11 and 12, the forward section 28 of the door stop 20 may extend from the base section 26 to a predefined height $h_1$ and a predefined width $w_{fs}$. In various instances, the forward section 28 may include a forward surface 48 and a chamfered surface 50 that extends from the forward surface 48. In some instances, contact with the forward section 28 may prevent further rotation of the door 10 (FIG. 1). In addition, the chamfered surface 50 may allow for easier movement of the door 10 into the retainment zone 38 while deflecting of the base section 26. As illustrated, a transition surface 52 may be defined between the chamfered surface 50 and a rear surface 54 of the forward section 28. The transition surface 52 may extend at an angle $\theta_3$ that is different from the chamfered surface 50 relative to the rear surface 54.

The intermediate section 30 of the door stop 20 also extends from the base section 26 on a common side of the base section 26 from the forward section 28 to a predefined height $h_2$. The intermediate section 30 may extend from the base section 26 at a position along the base section 26 that is spaced apart from the forward section 28. As illustrated, the intermediate section 30 may have a different geometry than the forward section 28 of the door stop 20.

The intermediate section 30 may be defined by a forward surface 56, an outer surface 58, and a rear surface 60, which may be discrete surfaces and/or one continuous surface. The forward surface 56 and rear surface 60 of the intermediate section 30 may be of a common height to define a height $h_2$ of the intermediate section 30. In some instances, the second height $h_2$ may be greater than the first height $h_1$. As such, the door 10 may be generally prevented from passing the intermediate section 30, even when the base section 26 is deflected within a defined magnitude range that may be defined by the general deflection magnitudes accomplished during normal use of the door stop 20.

The outer surface 58 may be operably coupled with the forward surface 56 and the rear surface 60 of the intermediate section 30 and define a width $w_{is}$ of the intermediate section 30. In various examples, the width $w_{is}$ of the intermediate section 30 may be generally equal to, greater than, or less than the width $w_{fs}$ of the forward section 28.

In addition, the intermediate section 30 and the forward section 28 may be separated by a predefined width $w_1$. The predefined width $w_1$ is greater than a width $w_d$ (FIG. 4) of the door 10 (FIG. 4) such that the door 10 may be positioned between intermediate section 30 and the forward section 28. In some instances, the intermediate section 30 may be selectively slidable and retained along the base portion to account for doors 10 of various widths.

In some instances, a retainment zone 38 is defined by the predefined width $w_1$ between the base section 26, the forward section 28, and the intermediate section 30. The retainment zone 38 may be configured to retain the door 10 therein. Accordingly, the width $w_1$ of the retainment zone 38 may be greater than the width $w_d$ of the door 10. In some instances, as the door 10 contacts the forward section 28 of the door stop 20, the base section 26 is deflected from an original position. As the base section 26 is deflected, the forward section 28 of the door stop 20 passes an edge of the door 10 thereby placing the door 10 between the intermediate section 30 and the forward section 28. To release the door 10 from the retainment zone 38, the release tab 36 may be pressed, thereby bending the base section 26 away from the door 10 and freeing the door 10 to swing over the forward section 28.

In some instances, a rear surface 54 of the forward section 28 and/or a forward surface 56 of the intermediate section 30 may include a motion attenuating material 62 thereon and/or be formed from a motion attenuating material 62 to minimize marking of the door 10 when the door 10 is positioned between intermediate section 30 and the forward section 28. In various examples, the motion attenuating material 62 may be made a foam material, an elastomeric material, a polymeric material, a resilient woven material, or other flexible materials and combinations thereof.

The rear section 32 may extend from the base section 26 and define a width $w_{rs}$. The rear section 32 may extend from the base section 26 at a position along the base section 26 that is spaced apart from the intermediate section 30. The width $w_{rs}$ of the rear section 32 may be generally equal to, greater than, or less than the width $w_{fs}$ of the forward section 28 and/or the intermediate section 30. As illustrated, the rear section 32 may define a fastener aperture 64. A fastener 66 (FIG. 7) may be positioned through the aperture 64 from coupling the door stop 20 to a support structure, such as a baseboard or a wall 22 (FIG. 2). In some examples, the fastener 66 may include a head portion 68 and a fastening portion 70. The head portion 68 may have a width that is larger than a width of the aperture 64 such that the fastener 66 compresses the rear section 32 of the door stop 20 against the support structure when the fastener 66 is fixed to the support structure. In some instances, the fastener aperture 64 may be either generally circular or non-circular. In instances in which the fastener aperture 64 is non-circular, the fastening portion 70 of the fastener 66 may be slid along the aperture 64 to allow for adjustability of the door stop 20 during installation thereof to the support structure.

In several examples, the rear section 32 may be non-perpendicular to the base section 26 and/or the extension axis EA of the base section 26. For example, in some examples, the rear section 32 may extend in an offset direction from the extension axis EA at a fourth angle θ4. The fourth angle θ4, in some examples, may be greater than 90 degrees and less than 180 degrees. In operation, when the door 10 (FIG. 1) contacts the door stop 20, at least some of the shock created may be absorbed by the door stop 20, which may be in the form of deflection of the base section 26 relative to the rear section 32 of the door stop. In such instances, the offset orientation of the rear section 32 from the extension axis EA at the fourth angle θ4 may allow deflection in a predefined direction relative to the extension axis EA and/or allows for the door 10 to be further away from the wall 22 (FIG. 1) and still contact the intermediate section 28 of the door stop 20.

As illustrated in FIGS. 13-20, in some instances, a transitional portion 74 may extend from a forward surface of the rear section 32 and/or an upper surface of the base section 26. The transitional portion 74 may have a curved geometry.

Referring now to FIGS. 13-20, as provided herein, in some examples, a forward portion of the base section 26 may define a release tab 36. When pressure is applied to the release tab 36 in a direction that is opposite to a door side of the base section 26, the base section 26 can be bent away from the door 10 thereby releasing the door 10. In some examples, such as those illustrated in FIGS. 11-18, the release tab 36 may have a thickness $t_1$ that is less than a thickness $t_2$ of one or more remaining portions of the base section 26. Furthermore, in various examples, the release tab 36 may have a semi-circular, rectilinear, and/or other geometry.

Referring further to FIGS. 13-20, the forward section 28 of the door stop 20 may extend from the base section 26 to a predefined height $h_1$ and a predefined width $w_{fs}$. In various instances, the forward section 28 may include a forward surface 48 and a chamfered surface 50 that extends from the forward surface 48. In some instances, contact with the chamfered surface 50 by the door 10 causes bending of the base section 26. As such, in some examples, the door stop 20 may be placed at a height such that the door 10 initially contacts the chamfered surface 50 when the door 10 contacts the door stop 20. As illustrated, a transition surface 52 may be defined between the chamfered surface 50 and a rear surface 54 of the forward section 28. The transition surface 52 may extend at an angle that is different from the chamfered surface 50 relative to the rear surface 54.

The intermediate section 30 of the door stop 20 also extends from the base section 26 on a common side of the base section 26 from the forward section 28 to a predefined height $h_2$. The intermediate section 30 may extend from the base section 26 at a position along the base section 26 that is spaced apart from the forward section 28. As illustrated, the intermediate section 30 may have a different geometry than the forward section 28 of the door stop 20.

The intermediate section 30 may be defined by a forward surface 56, an outer surface 58, and a rear surface 60, which may be discrete surfaces and/or one continuous surface. The forward surface 56 and rear surface 60 of the intermediate section 30 may be of a common height to define a height $h_2$ of the intermediate section 30. In some instances, the second height $h_2$ may be greater than the first height $h_1$. As such, the door 10 may be generally prevented from passing the intermediate section 30, even when the base section 26 is deflected within a defined magnitude range that may be defined by the general deflection magnitudes accomplished during normal use of the door stop 20.

The outer surface 58 may be operably coupled with the forward surface 56 and the rear surface 60 of the intermediate section 30 and define a width $w_{is}$ of the intermediate section 30. In various examples, the width $w_{is}$ of the intermediate section 30 may be generally equal to, greater than, or less than the width $w_{fs}$ of the forward section 28.

In addition, the intermediate section 30 and the forward section 28 may be separated by a predefined width $w_1$. The predefined width $w_1$ is greater than a width $w_d$ (FIG. 4) of the door 10 (FIG. 4) such that the door 10 may be positioned between intermediate section 30 and the forward section 28. In some instances, the intermediate section 30 may be selectively slidable and retained along the base portion to account for doors 10 of various widths.

In some instances, a retainment zone 38 is defined by the predefined width $w_1$ between the base section 26, the forward section 28, and the intermediate section 30. The retainment zone 38 may be configured to retain the door 10 therein. Accordingly, the width $w_1$ of the retainment zone 38 may be greater than the width $w_d$ of the door 10. In some instances, as the door 10 contacts the forward section 28 of the door stop 20, the base section 26 is deflected from an original position. As the base section 26 is bent, the forward section 28 of the door stop 20 passes an edge of the door 10 thereby placing the door 10 between the intermediate section 30 and the forward section 28. To release the door 10 from the retainment zone 38, the release tab 36 may be pressed, thereby bending the base section 26 away from the door 10 and freeing the door 10 to swing over the forward section 28.

In some instances, a rear surface 54 of the forward section 28 and/or a forward surface 56 of the intermediate section 30 may include a motion attenuating material 62 thereon and/or be formed from a motion attenuating material 62 to minimize marking of the door 10 when the door 10 is positioned between intermediate section 30 and the forward section 28. In various examples, the motion attenuating material 62 may be made a foam material, an elastomeric material, a polymeric material, a resilient woven material, or other flexible materials and combinations thereof.

The rear section 32 may extend from the base section 26 and define a width $w_{rs}$. The rear section 32 may extend from the base section 26 at a position along the base section 26 that is spaced apart from the intermediate section 30. The width $w_{rs}$ of the rear section 32 may be generally equal to, greater than, or less than the width $w_{fs}$ of the forward section 28 and/or the intermediate section 30. As illustrated, the rear section 32 may define a fastener aperture 64. A fastener 66 (FIG. 7) may be positioned through the aperture 64 from coupling the door stop 20 to a support structure, such as a baseboard or a wall 22 (FIG. 2). In some examples, the fastener 66 may include a head portion 68 and a fastening portion 70. The head portion 68 may have a width that is larger than a width of the aperture 64 such that the fastener 66 compresses the rear section 32 of the door stop 20 against the support structure when the fastener 66 is fixed to the support structure. In some instances, the fastener aperture 64 may be either generally circular or non-circular. In instances in which the fastener aperture 64 is non-circular, the fastening portion 70 of the fastener 66 may be slid along the aperture 64 to allow for adjustability of the door stop 20 during installation thereof to the support structure.

In several examples, a rim portion 72 may extend about the aperture 64. The rim portion 72 may have a varied thickness from the aperture 64 to at least a portion of the rear section 32 of the door stop 20. The varied thickness may assist in directing the fastener 66 through the aperture 64.

As illustrated in FIGS. 13-20, in some instances, a transitional portion 74 may extend from a forward surface of the rear section 32 and/or an upper surface of the base section 26. The transitional portion 74 may have a varied thickness from the base section 26 and/or the rear section 32. In operation, should the door 10 move beyond the intermediate section 30, the transitional portion 74 may contact the door 10 prior to the door 10 contacting the rear section 32 of the door stop 20. Additionally or alternatively, the transitional portion 74 may provide additional support and rigidity to the base section 26. The additional support and rigidity to the base section 26 may allow for a more resilient base section 26 thereby extending the life span of the door stop 20.

Referring now to FIGS. 21-28, as provided herein, in some examples, a forward portion of the base section 26 may define a release tab 36. When pressure is applied to the release tab 36 in a direction that is opposite to a door side of the base section 26, the base section 26 can be bent away from the door 10 thereby releasing the door 10. In some examples, such as those illustrated in FIGS. 21-28, the release tab 36 may have a thickness $t_3$ that is less than a thickness $t_4$, $t_5$ of one or more remaining portions of the base section 26. Furthermore, in various examples, the release tab 36 may have a semi-circular, rectilinear, and/or other geometry.

As illustrated, the forward section 28 of the door stop 20 may extend from the base section 26 to a predefined height $h_1$ and a predefined width $w_{fs}$. In various instances, the forward section 28 may include a forward surface 48 and a chamfered surface 50 that extends from the forward surface 48. In some instances, contact with the chamfered surface 50 by the door 10 causes bending of the base section 26. As such, in some examples, the door stop 20 may be placed at a height such that the door 10 initially contacts the chamfered surface 50 when the door 10 contacts the door stop 20. As illustrated, a transition surface 52 may be defined between the chamfered surface 50 and a rear surface 54 of the forward section 28. The transition surface 52 may extend at an angle that is different from the chamfered surface 50 relative to the rear surface 54.

The intermediate section 30 of the door stop 20 also extends from the base section 26 on a common side of the base section 26 from the forward section 28 to a predefined height $h_2$. As illustrated, the intermediate section 30 may have a different geometry than the forward section 28 of the door stop 20.

The intermediate section 30 may be defined by a forward surface 56, an outer surface 58, and a rear surface 60, which may be discrete surfaces and/or one continuous surface. The forward surface 56 and rear surface 60 of the intermediate section 30 may be of a common height $h_2$ to define a height of the intermediate section 30. In some instances, the second height $h_2$ may be greater than the first height $h_1$. As such, the door 10 may be generally prevented from passing the intermediate section 30, even when the base section 26 is deflected within a defined magnitude range that may be defined by the general deflection magnitudes accomplished during normal use of the door stop 20.

The outer surface 58 may be operably coupled with the forward surface 56 and the rear surface 60 of the intermediate section 30 and define a width $w_{is}$ of the intermediate section 30. In various examples, the width $w_{is}$ of the intermediate section 30 may be generally equal to, greater than, or less than the width $w_{fs}$ of the forward section 28.

In addition, the intermediate section 30 and the forward section 28 may be separated by a predefined width $w_1$. The predefined width $w_1$ is greater than a width $w_d$ (FIG. 4) of the door 10 (FIG. 4) such that the door 10 may be positioned between intermediate section 30 and the forward section 28. In some instances, the intermediate section 30 may be selectively slidable and retained along the base portion to account for doors 10 of various widths.

In some instances, a retainment zone 38 is defined by the predefined width $w_1$ between the base section 26, the forward section 28, and the intermediate section 30. The retainment zone 38 may be configured to retain the door 10 therein. Accordingly, the width $w_1$ of the retainment zone 38 may be greater than the width $w_d$ of the door 10. In some instances, as the door 10 contacts the forward section 28 of the door stop 20, the base section 26 is deflected from an original position. As the base section 26 is bent, the forward section 28 of the door stop 20 passes an edge of the door 10 thereby placing the door 10 between the intermediate section 30 and the forward section 28. To release the door 10 from the retainment zone 38, the release tab 36 may be pressed, thereby bending the base section 26 away from the door 10 and freeing the door 10 to swing over the forward section 28.

In some instances, a rear surface 54 of the forward section 28 and/or a forward surface 56 of the intermediate section 30 may include a motion attenuating material 62 thereon and/or be formed from a motion attenuating material 62 to minimize marking of the door 10 when the door 10 is positioned between intermediate section 30 and the forward section 28. In various examples, the motion attenuating material 62 may be made a foam material, an elastomeric material, a polymeric material, a resilient woven material, or other flexible materials and combinations thereof.

The rear section 32 may extend from the base section 26 and define a width $w_{rs}$. The width $w_{rs}$ of the rear section 32 may be generally equal to, greater than, or less than the width $w_{fs}$ of the forward section 28 and/or the intermediate section 30. As illustrated, the rear section 32 may define a fastener aperture 64. A fastener 66 (FIG. 7) may be positioned through the aperture 64 from coupling the door stop 20 to a support structure, such as a baseboard or a wall 22 (FIG. 2). In some examples, the fastener 66 may include a head portion 68 and a fastening portion 70. The head portion 68 may have a width that is larger than a width of the aperture 64 such that the fastener 66 compresses the rear section 32 of the door stop 20 against the support structure when the fastener 66 is fixed to the support structure. In some instances, the fastener aperture 64 may be either generally circular or non-circular. In instances in which the fastener aperture 64 is non-circular, the fastening portion 70 of the fastener 66 may be slid along the aperture 64 to allow for adjustability of the door stop 20 during installation thereof to the support structure.

In several examples, a rim portion 72 may extend about the aperture 64. The rim portion 72 may have a varied thickness from the aperture 64 to at least a portion of the rear section 32 of the door stop 20. The varied thickness may assist in directing the fastener 66 through the aperture 64.

As illustrated in FIGS. 21-28, in some instances, a transitional portion 74 may extend from a forward surface of the rear section 32 and/or an upper surface of the base section 26. The transitional portion 74 may have a varied thickness from the base section 26 and/or the rear section 32. In operation, should the door 10 move beyond the intermediate section 30, the transitional portion 74 may contact the door 10 prior to the door 10 contacting the rear section 32 of the door stop 20. Additionally or alternatively, the transitional portion 74 may provide additional support and rigidity to the base section 26. The additional support and rigidity to the base section 26 may allow for a more resilient base section 26 thereby extending the life span of the door stop 20.

In the examples illustrated in FIGS. 21-28, the base section 26 may have a first thickness $t_4$ along the portion of the base section 26 that defines the retainment zone 38 and a second thickness $t_5$ rearwardly of the retainment zone 38. In some instances, the first thickness $t_4$ may allow for additional deflection in the retainment zone 38 and a higher rigidity rearward of the retainment zone 38.

Referring now to FIGS. 29-32, in some instances, the door stop 20 may include more than one intermediate section 30 in addition to any of the features described with regard to FIGS. 13-21. As illustrated, the door stop 20 may include multiple intermediate sections 30 which may be individually removed to account for various door thicknesses. In such instances, one or more intermediate sections may be removed to enlarge the retainment zone 38. In such instances, each of the intermediate sections may be perforated or otherwise weakened to make for easier removal thereof.

In some instances, each of the intermediate sections 30 may have a varied height $h_a$, $h_b$, $h_c$. In various examples, $h_a$ may be greater than $h_b$. Likewise, $h_b$ may be greater than $h_c$. The decreasing height may be due to the decrease in deflection of the base section 26 as the intermediate section 30 is moved closer to the rear section 32.

Figure 33:
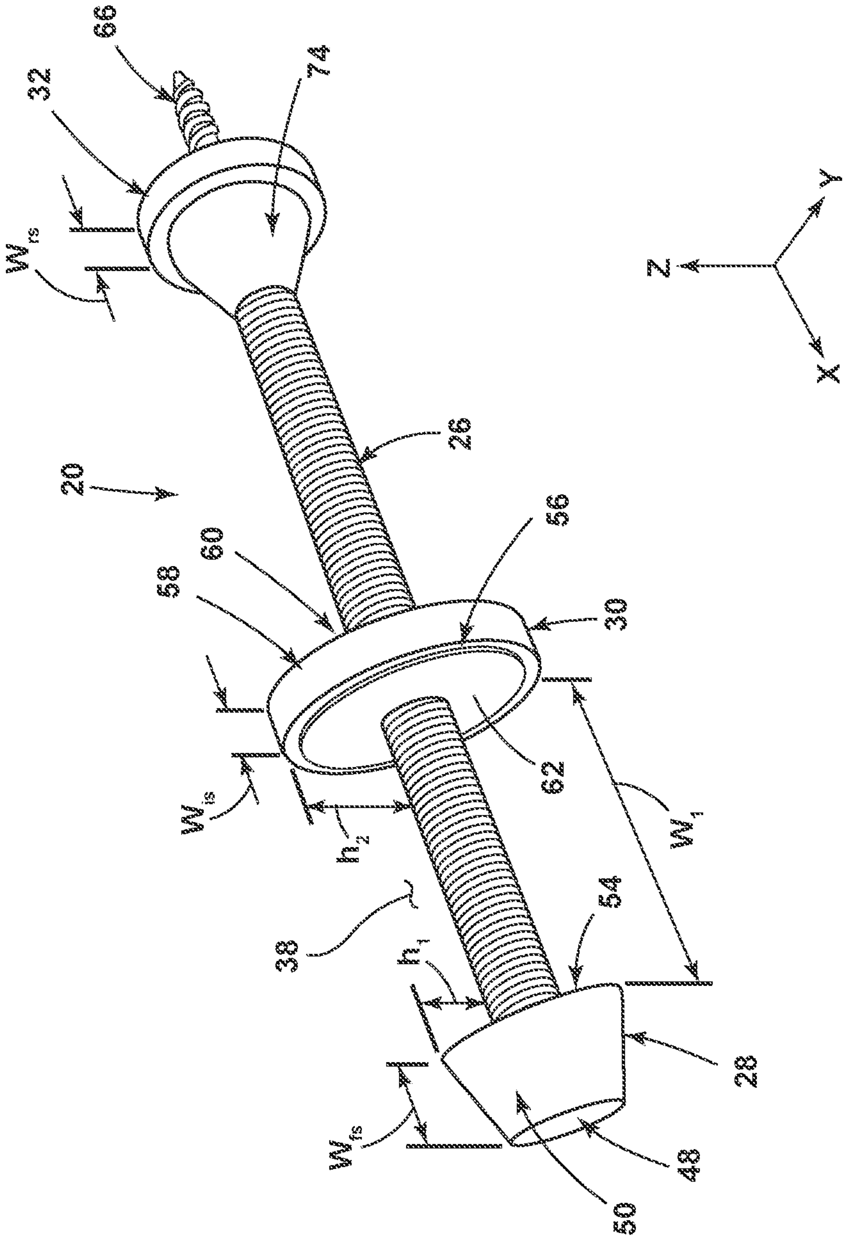
FIG. 33 is a front perspective view of the door stop according to various aspects of the present disclosure.

Referring now to FIG. 33, in various instances, the forward section 28 of the door stop 20 may define the release tab 36. When pressure is applied to the release tab 36 in a direction that is opposite to a door side of the base section 26, the base section 26 can be bent away from the door 10 thereby releasing the door 10. In some examples, such as those illustrated in FIGS. 21-28, the release tab 36 may have a thickness $t_3$ that is less than a thickness $t_4$, $t_5$ of one or more remaining portions of the base section 26. Furthermore, in various examples, the release tab 36 may have a semi-circular, rectilinear, and/or other geometry.

As illustrated, the forward section 28 of the door stop 20 may circumferentially extend from the base section 26 to a predefined height $h_1$ and a predefined width $w_{fs}$. In various instances, the forward section 28 may include a forward surface 48 and a chamfered surface 50 that extends from forward surface 48. In some instances, contact with the chamfered surface 50 by the door 10 causes bending of the base section 26. As such, in some examples, the door stop 20 may be placed at a height such that the door 10 initially contacts the chamfered surface 50 when the door 10 contacts the door stop 20.

The intermediate section 30 of the door stop 20 also extends circumferentially outward from the base section 26 to a predefined height $h_2$, which may be different, or generally equal to the first height $h_1$. As illustrated, the intermediate section 30 may have a different geometry than the forward section 28 of the door stop 20.

The intermediate section 30 may be defined by a forward surface 56, an outer surface 58, and a rear surface 60, which may be discrete surfaces and/or one continuous surface. The forward surface 56 and rear surface 60 of the intermediate section 30 may be of a common height $h_2$ to define a height of the intermediate section 30. In some instances, the second height $h_2$ may be greater than the first height $h_1$. As such, the door 10 may be generally prevented from passing the intermediate section 30, even when the base section 26 is deflected within a defined magnitude range that may be defined by the general deflection magnitudes accomplished during normal use of the door stop 20.

The outer surface 58 may be operably coupled with the forward surface 56 and the rear surface 60 of the intermediate section 30 and define a width $w_{is}$ of the intermediate section 30. In various examples, the width $w_{is}$ of the intermediate section 30 may be generally equal to, greater than, or less than the width $w_{fs}$ of the forward section 28.

In addition, the intermediate section 30 and the forward section 28 may be separated by a predefined width $w_1$. The predefined width $w_1$ is greater than a width $w_d$ (FIG. 4) of the door 10 (FIG. 4) such that the door 10 may be positioned between intermediate section 30 and the forward section 28. In some instances, the intermediate section 30 may be selectively slidable and retained along the base portion to account for doors 10 of various widths.

In some instances, a retainment zone 38 is defined by the predefined width $w_1$ between the base section 26, the forward section 28, and the intermediate section 30. The retainment zone 38 may be configured to retain the door 10 therein. In some instances, as the door 10 contacts the forward section 28 of the door stop 20, the base section 26 is deflected from an original position. As the base section 26 is bent, the forward section 28 of the door stop 20 passes an edge of the door 10 thereby placing the door 10 between the intermediate section 30 and the forward section 28. To release the door 10 from the retainment zone 38, the release tab 36 may be pressed, thereby bending the base section 26 away from the door 10 and freeing the door 10 to swing over the forward section 28.

In some instances, a rear surface 54 of the forward section 28 and/or a forward surface 56 of the intermediate section 30 may include a motion attenuating material 62 thereon and/or be formed from a motion attenuating material 62 to minimize marking of the door 10 when the door 10 is positioned between intermediate section 30 and the forward section 28. In various examples, the motion attenuating material 62 may be made a foam material, an elastomeric material, a polymeric material, a resilient woven material, or other flexible materials and combinations thereof.

The rear section 32 may extend from the base section 26 and define a width $w_{rs}$. The width $w_{rs}$ of the rear section 32 may be generally equal to, greater than, or less than the width $w_{fs}$ of the forward section 28 and/or the width $w_{is}$ of the intermediate section 30. As illustrated, the rear section 32 may support and/or define an aperture 64 that extends therefrom. The fastener 66 may couple the door stop 20 to a support structure, such as a baseboard or a wall 22 (FIG. 2). Additionally or alternatively, the door stop 20 may include a mounting plate that mounts to the support structure and the rear section 32 may operably couple with the mounting plate.

As illustrated in FIG. 33, in some instances, a transitional portion 74 may extend from a forward surface of the rear section 32 and/or an upper surface of the base section 26. The transitional portion 74 may have a varied thickness from the base section 26 and/or the rear section 32. In operation, should the door 10 move beyond the intermediate section 30, the transitional portion 74 may contact the door 10 prior to the door 10 contacting the rear section 32 of the door stop 20. Additionally or alternatively, the transitional portion 74 may provide additional support and rigidity to the base section 26. The additional support and rigidity to the base section 26 may allow for a more resilient base section 26 thereby extending the life span of the door stop 20.

Figure 34:
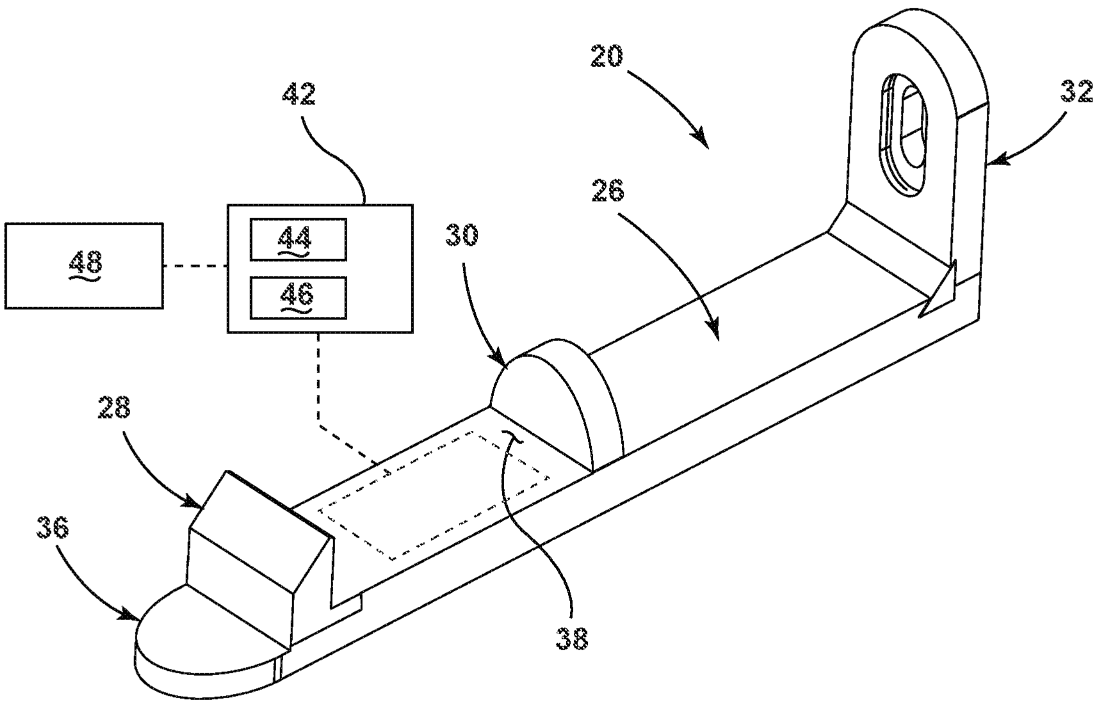
FIG. 34 is a front perspective view of the door stop having a sensor positioned within a retainment zone according to various aspects of the present disclosure.
Figure 35:
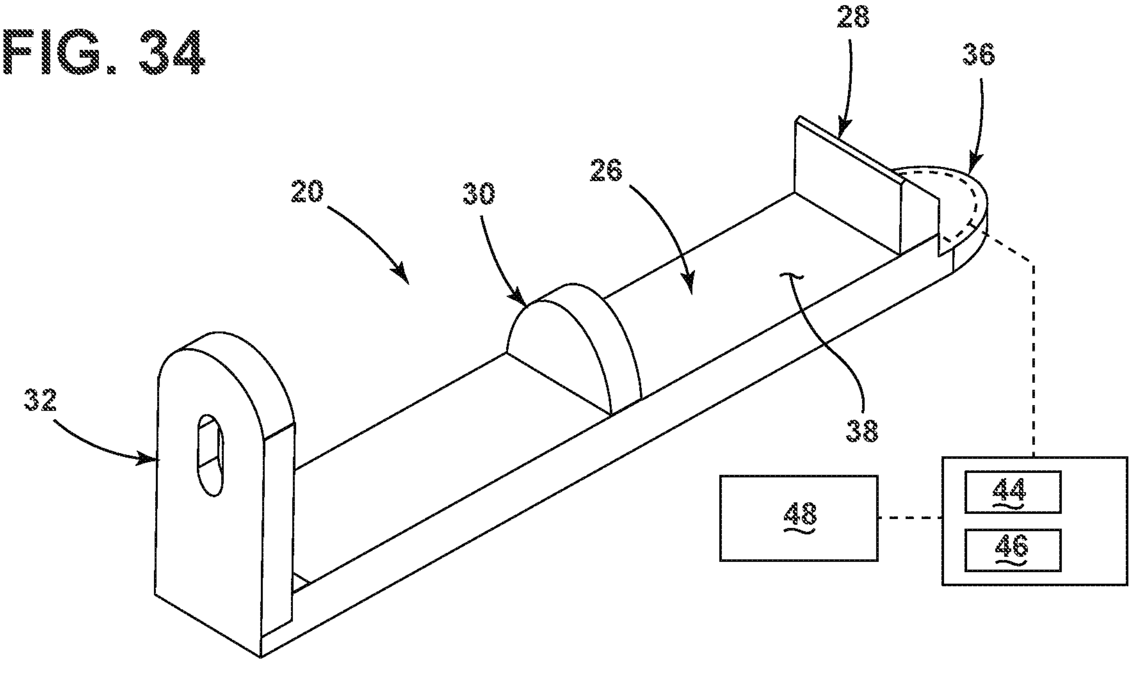
FIG. 35 is a rear perspective view of the door stop having a sensor positioned within a release tab according to various aspects of the present disclosure.

In the examples illustrated in FIGS. 34 and 35, to monitor the movement of the base section 26, one or more sensors 40 can be operably coupled with the door stop 20. For example, the one or more sensors 40 may be configured to provide data related to a position of a portion of the door stop 20 and/or whether a door 10 is positioned within the retainment zone 38.

A computing system 42 is communicatively coupled to the one or more sensors 40. In general, the computing system 42 may comprise one or more processor-based devices, such as a given controller or computing device or any suitable combination of controllers or computing devices. Thus, in several instances, the computing system 42 may include one or more processor(s) 44, and associated memory device(s) 46 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 46 of the computing system 42 may generally comprise memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 148 may generally be configured to store suitable computer-readable instructions that, when implemented by the processor(s) 44, configure the computing system 42 to perform various computer-implemented functions, such as one or more aspects of the methods and algorithms that will be described herein. In addition, the computing system 42 may also include various other suitable components, such as a communications circuit or module, one or more input/output channels, a data/control bus, and/or the like.

It should be appreciated that the various functions of the computing system 42 may be performed by a single processor-based device or may be distributed across any number of processor-based devices, in which instance such devices may be considered to form part of the computing system 42. In any case, the computing system 42 may provide instructions for various other components communicatively coupled with the computing system 42 based on the results of the data analysis. For example, the computing system 42 may provide notifications and/or instructions to a remote electronic device 82 if a deflection magnitude exceeds a predefined threshold, a retainment zone 38 accepts a door 10, a door 10 is removed from the retainment zone 38, and/or if any other change occurs proximate to the door stop 20.

To communicate with the remote electronic device 82, the computing system 42 may also include a communications interface 80. For instance, the communications interface 80 may communicate via wired and/or wireless communication with the remote electronic device 82. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 82 may also include a display for displaying information to a user. For instance, the electronic device 82 may display one or more graphical user interfaces and may be capable of receiving remote inputs related to the door stop 20. In addition, the electronic device 82 may provide feedback information, such as visual, audible, and tactile alerts. It will be appreciated that the electronic device 82 may be any one of a variety of computing devices and may include a processor and memory. For example, the electronic device 82 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In some embodiments, the door stop 20 set forth in FIGS. 1-35 may be generally formed from and/or lined with a material that can be manipulated with heat or electric current, such as Nitinol. In such instances, the door stop 20 can be flexed to release the door 10 from a retainment zone 38 of the door stop 20 with current or heat. For example, based on predefined conditions and/or through a user input, the computing system 42 may provide current to the door stop 20, which may cause the base section 26 to deform from its shape thereby releasing the door 10. In addition, the base section 26 may additionally or alternatively be configured to deform once the door stop 20 experiences a predefined temperature. In such instances, heat from a fire may cause flexing of the door stop 20 thereby releasing the door 10 from the retirement zone 38. In some examples, if the computing system 42 was unsuccessful in delivering sufficient current to the door stop 20 to cause flexing thereof, heat may also release the door so that the door stop 20 may be implemented to close fire doors, as set forth in various building codes.

Figure 36:
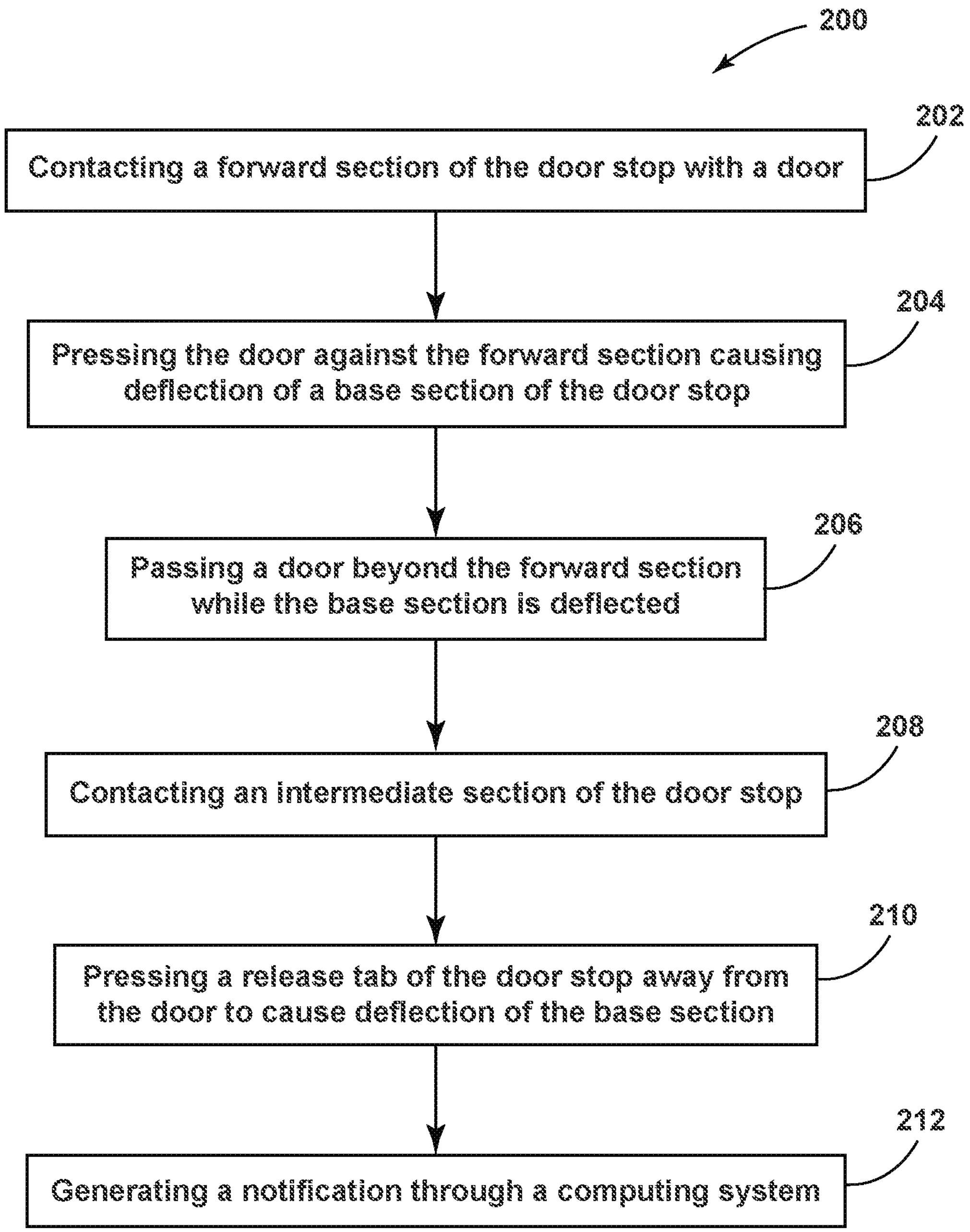
FIG. 36 illustrates a flow diagram of a method of operating a door stop in accordance with aspects of the present subject matter.

Referring now to FIG. 36, a flow diagram of a method 200 of operating a door stop is illustrated in accordance with aspects of the present subject matter. In general, the method 200 will be described herein with reference to the embodiments of the door stop shown in FIGS. 1-35. Although FIG. 36 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and-or adapted in various ways without deviating from the scope of the present disclosure.

At step 202, the method includes contacting a forward section of the door stop with a door. As provided herein, the door can be attached to a door frame through one or more hinges and configured to rotate between a plurality of positions. The plurality of positions may include a first open position, a second intermediate position, and a third closed position. The door has a door outer surface and can have a doorknob secured to the door. A door stop can be attached to a structure proximate to the door, such as a wall. In some instances, the door stop can be attached to the wall and configured to project towards the door outer surface 16.

The door stop can project in the path of the swinging door such that the door contacts the door stop while moving from the third position to the first position. As such, the method 200, at step 204, includes pressing the door against the forward section causing deflection of a base section of the door stop At step 206, the method 200 includes passing a door beyond the forward section while the base section is deflected. Next, at step 208, the method includes contacting an intermediate section of the door stop. The intermediate section can prevent further movement of the door towards a wall. In some instances, contacting the intermediate section of the door stop can include contacting a movement attenuation material positioned on the intermediate section. As provided herein, a rear surface of the forward section and/or a forward surface of the intermediate section may include the motion attenuating material thereon and/or be formed from a motion attenuating material to minimize marking of the door when the door is positioned between intermediate section 30 and the forward section. In various examples, the motion attenuating material may be made a foam material, an elastomeric material, a polymeric material, a resilient woven material, or other flexible materials and combinations thereof.

At step 210, the method 200 can include pressing a release tab of the door stop away from the door to cause deflection of the base section allowing movement of the door from the first position to a second position.

In addition, at step 212, the method can also include generating a notification through a computing system when one or more sensors detect deflection of the base section beyond a defined threshold.

Use of the present disclosure may offer a variety of advantages, which is provided by various combinations of the features provided herein. For instance, the door top provided herein may be capable of restricting the door from contacting a proximate wall and/or retain the door in an open position. The door stop may also be positioned along portions of the door that are out of reach of small children. The door stop provided herein may be manufactured at lower costs compared to other door stops that are only capable of a single installation process.

It will be understood by one having ordinary skill in the art that construction of the described invention and other components is not limited to any specific material. Other example examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

It is also important to note that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other example examples without departing from the spirit of the present innovations.

It will be understood that any described processes or steps within described processes may be combined with other disclosed processes or steps to form structures within the scope of the present invention. The example structures and processes disclosed herein are for illustrative purposes and are not to be construed as limiting. In addition, variations and modifications can be made on the aforementioned structures and methods without departing from the concepts of the present invention and such concepts are intended to be covered by the following claims unless these claims by their language expressly state otherwise.

What is claimed is:

1. A door stop, comprising:

a base section configured to be positioned at least partially offset from a door, the base section defining an extension axis;

a forward section extending from the base section;

an intermediate section extending from the base section at a position along the base section that is spaced apart from the forward section; and a rear section extending from the base section at a position along the base section that is spaced apart from the intermediate section, the rear section extending in an offset direction from the extension axis at a defined angle, the defined angle between ninety degrees and one-hundred eight degrees, wherein a retainment zone is defined between the base section, the forward section, and the intermediate section.

2. The door stop of claim 1, wherein the forward section defines a chamfered surface, and wherein contact with the chamfered surface by the door causes bending of the base section.

3. The door stop of claim 1, wherein the forward section defines a first height from the base section and the intermediate section defines a second height, the second height being greater than the first height.

4. The door stop of claim 1, wherein the base section defines a first thickness between the forward section and the intermediate section and a second thickness between the intermediate section and the rear section.

5. The door stop of claim 1, wherein the rear section defines an aperture that is configured to receive a fastener therethrough.

6. The door stop of claim 1, further comprising:

one or more sensors configured to monitor a movement of the base section.

7. The door stop of claim 6, wherein the one or more sensors are operably coupled with a computing system, the computing system configured to generate one or more notifications based on the movement of the base section as detected by the one or more sensors.

8. The door stop of claim 1, further comprising:

a transitional portion extending from a forward surface of the rear section, the transitional portion having a varied thickness from the base section.

9. The door stop of claim 1, wherein each of the forward section and the intermediate section extend circumferentially outward of the base section.

10. The door stop of claim 1, wherein the intermediate section includes a first intermediate section and a second intermediate section each extending from the base section, the first intermediate section positioned between the forward section and the second intermediate section.

11. The door stop of claim 10, wherein each of the first intermediate section and the second intermediate section include a perforated section.

12. A door assembly, comprising:

a door rotatable between a first position and a second position; and a door stop configured to contact the door as the door is rotated between the first position and the second position, the door stop comprising:

a base section configured to be positioned at least partially offset from the door, the base section defining an extension axis;

a release tab extending in an offset direction from the extension axis at a first angle;

a forward section extending from the base section at a second offset angle, the first angle varied from the second angle; and an intermediate section extending from the base section at a position along the base section that is spaced apart from the forward section and on an opposing side of the forward section from the release tab, wherein a retainment zone is defined between the base section, the forward section, and the intermediate section, and wherein the door is positioned within the retainment zone when placed in the first position.

13. The door assembly of claim 12, wherein the forward section defines a chamfered surface, and wherein contact with the chamfered surface by the door causes bending of the base section.

14. The door assembly of claim 12, wherein a thickness of the release tab is less than a thickness of the base section between the forward section and the intermediate section.

15. A method of operating a door stop, the method comprising:

contacting a forward section of the door stop with a door;

pressing the door against the forward section causing deflection of a base section of the door stop;

passing a door beyond the forward section while the base section is deflected; and contacting an intermediate section of the door stop, the intermediate section preventing further movement of the door towards a wall, wherein at least a portion of the deflection is between the intermediate section and a rear section, the rear section on an opposing side of the intermediate section from the forward section.

16. The method of claim 15, wherein contacting the intermediate section of the door stop further comprises contacting a movement attenuation material positioned on the intermediate section.

17. The method of claim 15, further comprising:

pressing a release tab of the door stop away from the door to cause deflection of the base section allowing movement of the door from a first position to a second position.

18. The method of claim 15, further comprising:

generating a notification through a computing system when one or more sensors detect deflection of the base section beyond a defined threshold.

* * * * *